United States Patent
McIntosh

(10) Patent No.: US 12,291,351 B2
(45) Date of Patent: May 6, 2025

(54) DEPLOYABLE ATTENDANT SEAT AIRCRAFT CABIN BARRIER

(71) Applicant: The Boeing Company, Arlington, VA (US)

(72) Inventor: Darren Carl McIntosh, Mukilteo, WA (US)

(73) Assignee: THE BOEING COMPANY, Arlington, VA (US)

( * ) Notice: Subject to any disclaimer, the term of this patent is extended or adjusted under 35 U.S.C. 154(b) by 28 days.

(21) Appl. No.: 18/336,167

(22) Filed: Jun. 16, 2023

(65) Prior Publication Data

US 2024/0417102 A1    Dec. 19, 2024

(51) Int. Cl.
     *B64D 45/00*      (2006.01)
     *B64D 11/06*      (2006.01)

(52) U.S. Cl.
     CPC ...... *B64D 45/0026* (2019.08); *B64D 11/0691* (2014.12)

(58) Field of Classification Search
     CPC ............ B64D 45/0026; B64D 45/0028; B64C 1/1469
     See application file for complete search history.

(56) References Cited

U.S. PATENT DOCUMENTS

| | | |
|---|---|---|
| 5,285,596 A | 2/1994 | Kinsey |
| 6,783,098 B1 | 8/2004 | Chavez |
| 9,428,940 B1 | 8/2016 | Patrick |
| 10,717,534 B2 * | 7/2020 | Duckert ............. B64D 11/0691 |
| 11,208,744 B2 | 12/2021 | Urbelis |
| 2006/0145007 A1 * | 7/2006 | Melberg ............. B64D 45/0028 244/118.5 |
| 2014/0312173 A1 * | 10/2014 | Ehlers .................. B60N 2/3025 244/118.6 |
| 2016/0083092 A1 | 3/2016 | Long et al. |
| 2017/0341750 A1 | 11/2017 | Gonnsen |
| 2018/0265216 A1 | 9/2018 | Breigenzer |
| 2018/0346091 A1 | 12/2018 | Movsesian et al. |
| 2020/0115029 A1 | 4/2020 | Movsesian et al. |

FOREIGN PATENT DOCUMENTS

| | | |
|---|---|---|
| CN | 212614220 U | 2/2021 |
| EP | 2796370 A1 | 10/2014 |
| EP | 2851296 A1 | 3/2015 |
| EP | 3552963 A1 | 10/2019 |

(Continued)

OTHER PUBLICATIONS

EP Search Report mailed Jul. 24, 2024 in re EP Application No. 24167937.2.

(Continued)

*Primary Examiner* — Richard Green
*Assistant Examiner* — Nevena Aleksic
(74) *Attorney, Agent, or Firm* — COATS & BENNETT, PLLC

(57) ABSTRACT

A deployable attendant seat assembly that is configured to deploy in a vehicle cabin from a stowed position as an attendant seat into a deployed position configuring the deployable attendant seat assembly into a lockable barrier to prevent passengers from moving along an aisle in a vehicle cabin into a vehicle area forward of the lockable barrier.

21 Claims, 14 Drawing Sheets

(56) References Cited

FOREIGN PATENT DOCUMENTS

EP 3741676 A1 11/2020
GB 2307712 A 6/1997

OTHER PUBLICATIONS

Federal Aviation Administration, "AC 120-110—Aircraft Secondary Barriers and Alternate Flight Deck Security Procedures", U.S. Department of Transportation, Apr. 14, 2015, pp. 1-5.
Hexarmor, "SuperFabric cut protection, HexArmor with cut-resistant SuperFabric inside", Jan. 1, 2023, pp. 1-2.
Aitex, "Anti-Vandal Upholstery Resistant to Cuts by Stabs and Arson", retrieved from the internet: URL: https://www.aitex.es/tapicerias-antivandalicas/ [retrieved on May 2, 2023]; pp. 1-5.
Cut-Tex Pro, "The Ultimate Cut Protection-Technical Data Sheet", Jan. 1, 2023, pp. 1-3.
Peppermill Home, "Spectrum Via 36×80 Vinyl Folding Door", Jan. 1, 2023, pp. 1-5.
Wheatbelt, Inc., "Two New Rolling Shutter Slats from Wheatbelt, Inc." Jan. 1, 2023, pp. 1-5.
Wheatbelt, Inc., "Rolling Shutter Manufacturing in Hillsboro, KS", retrieved from the internet: URL: https://www.rollupshutter.com [retrieved on Jun. 15, 2023], pp. 1.
Roll-a-Shield, "RAS-section-view-of-slats", retrieved from the internet: URL: https://rollashield.com/shutters/ras-section-view-of-slats/ [retrieved on Jun. 15, 2023], pp. 1-2.
Cut-Tex Pro, "Cut Resistant Fabric for Clothing & Workwear (Cut Level 5)", retrieved from the internet: URL: https://cut-tex.com/ [retrieved on Jun. 15, 2023], pp. 1-25.
Aitex, "Vandal Proof Upholstery Which Can Withstand Slashing and Burning", retrieved from the internet: URL: https://www.aitex.es/tapicerias-antivandalicas/?lang=en [retrieved on Jun. 15, 2023], pp. 1-5.
Hexarmor, "Global Leader in Personal Protective Equipment", retrieved from the internet: URL: https://www.hexarmor.com/ [retrieved on Jun. 15, 2023], pp. 1-5.
Kozane, "High-performance and cut-resistant fabrics for outstanding protection and wearability", retrieved from the internet: URL: https://www.kozaneprotection.com/ [retrieved on Jun. 15, 2023], pp. 1-6.
EP Search Report mailed Aug. 26, 2024 in re EP Application No. 24165860.8.

\* cited by examiner

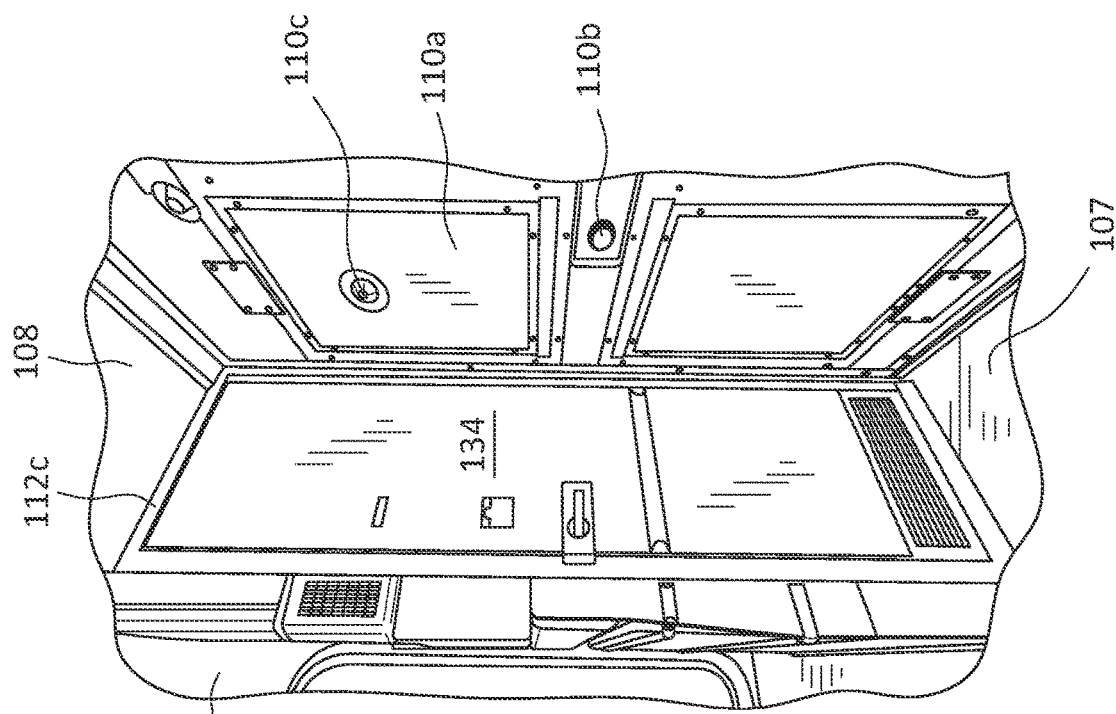
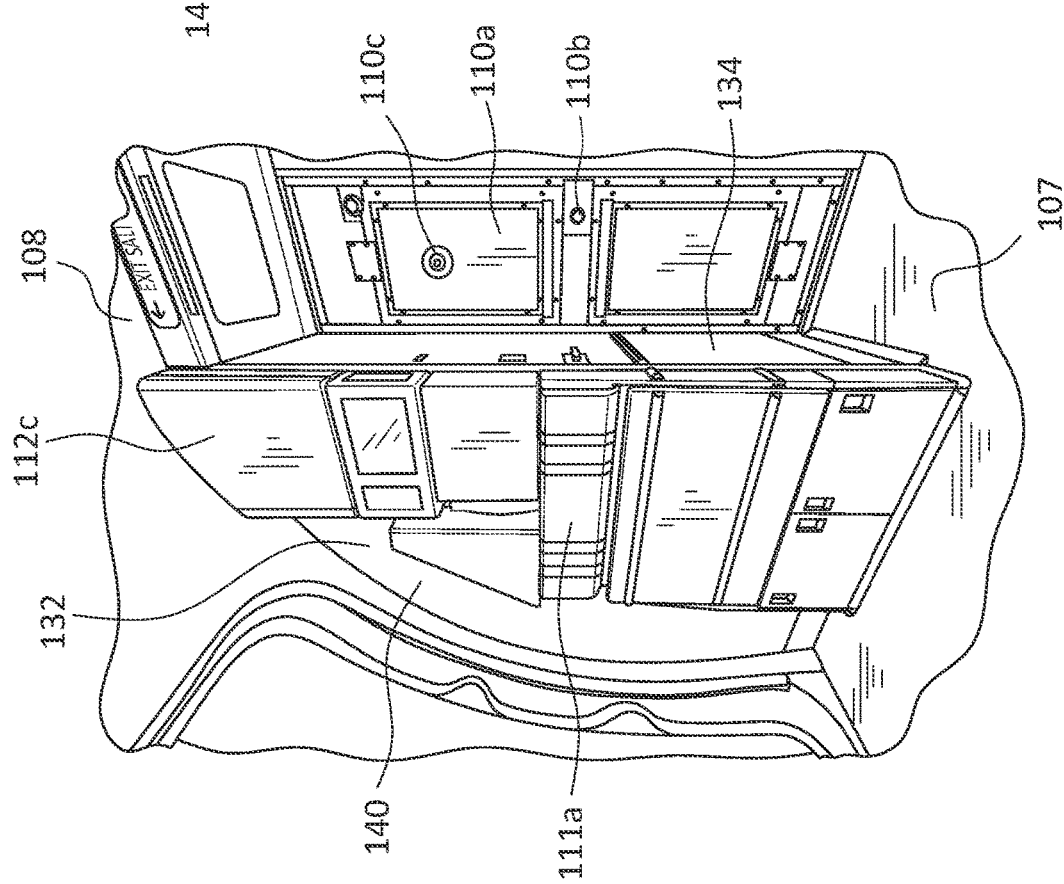
FIG. 3B
FIG. 3A

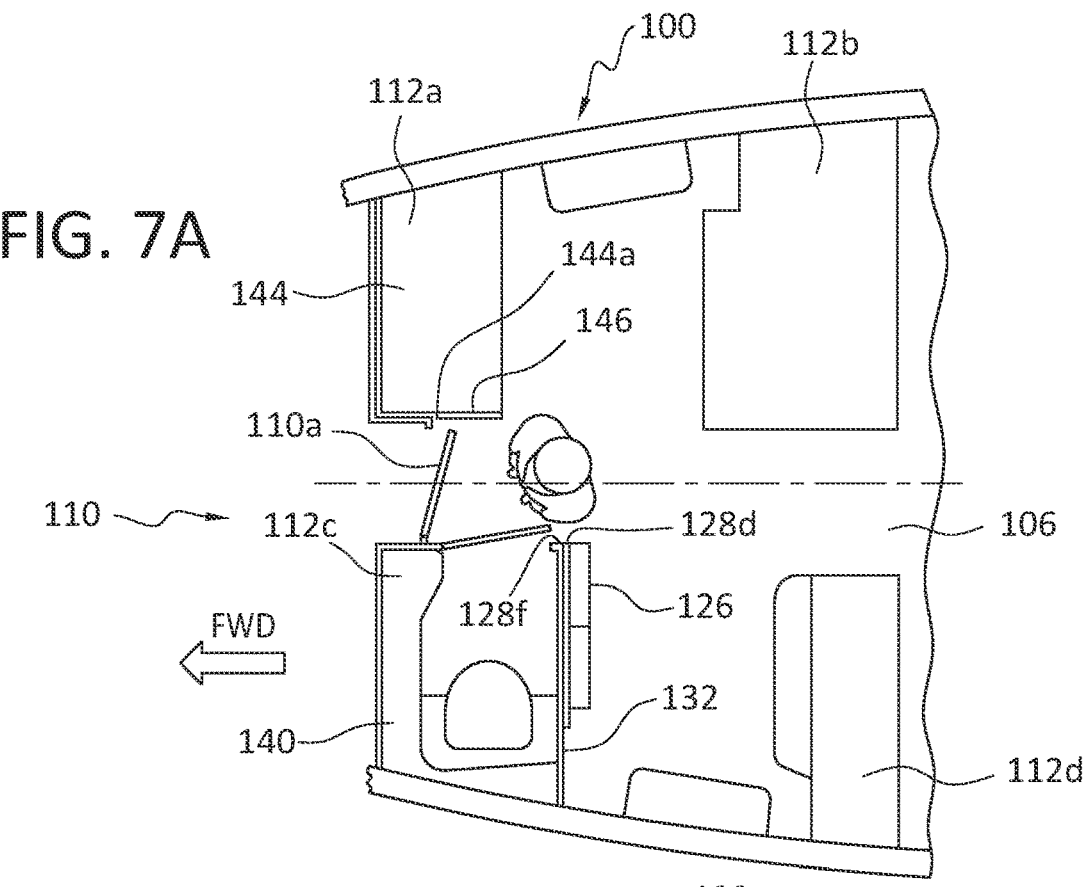
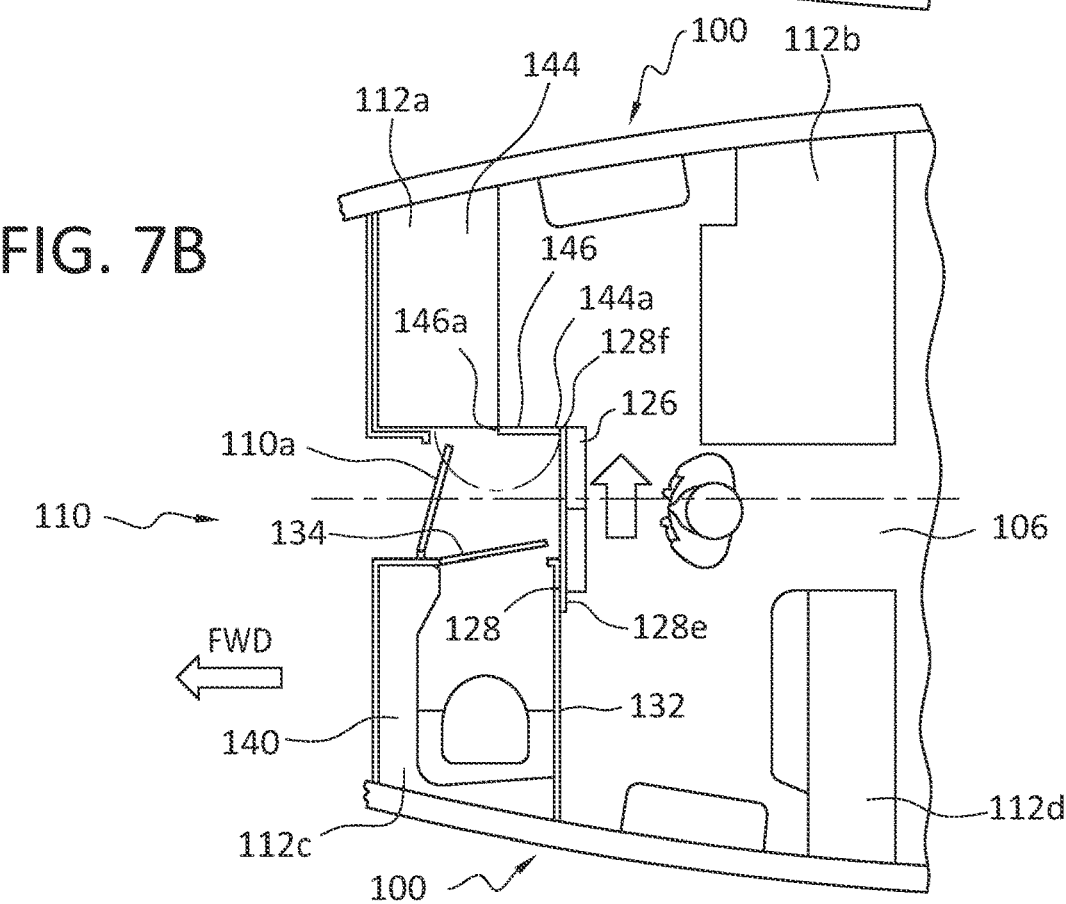

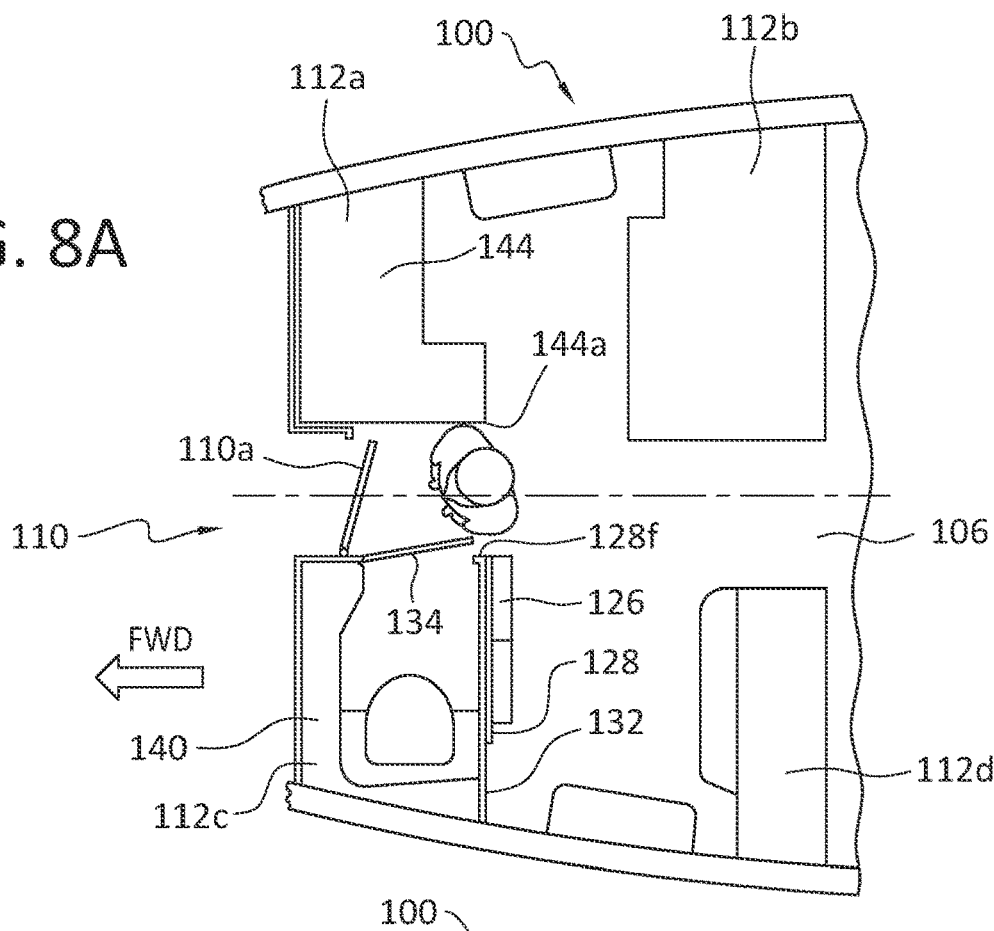
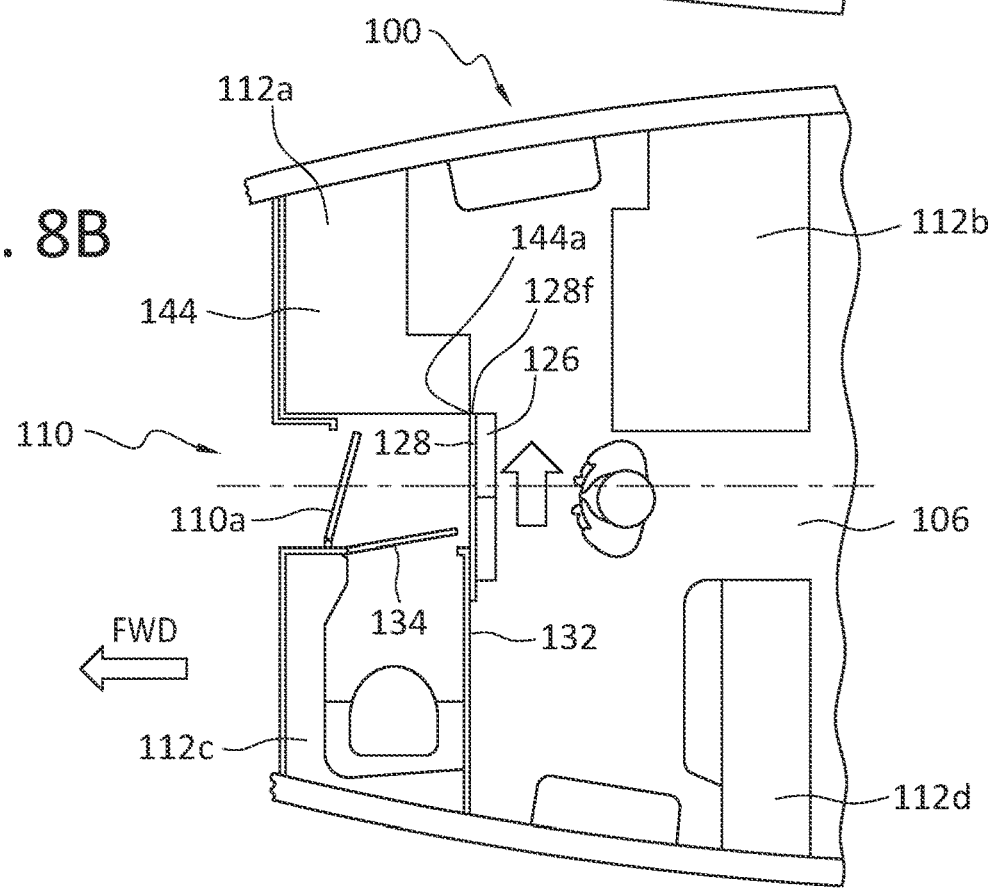

DEPLOYABLE ATTENDANT SEAT AIRCRAFT CABIN BARRIER

TECHNOLOGICAL FIELD

The present disclosure relates generally to the field of barriers and, more specifically, to barrier doors configured to be used within an aircraft.

BACKGROUND

Aircraft have a flight deck that includes flight instruments, instrument panels, and various controls that enable the flight personnel to operate the aircraft. The flight deck is positioned towards the front of the aircraft and is usually a separate compartment away from the cabin area where passengers sit during flight. A flight deck door further separates the flight deck from the cabin area.

The flight deck door is closed and locked during flight. This allows the flight personnel to concentrate on operating the aircraft and also prevents entry of unwanted persons into the flight deck. However, the flight deck door may be opened during flight for various reasons. One occurrence is when the flight personnel use the lavatory which is located in the cabin area of the aircraft. Another occurrence is when food and/or drinks that are prepared in the galley of the cabin area are delivered to the flight personnel on the flight deck.

Opening of the flight deck door could present an opportunity for an unwanted person to gain entry to the flight deck. The unwanted person could suddenly rush the front of the aircraft once the flight deck door is opened and force their way into the flight deck. It would be difficult for flight personnel working in the cabin area to react to this movement in a fast enough manner to close and lock the flight deck door.

A device is needed that would inhibit a person from rushing towards the flight deck. The device would prevent the person from reaching the front of the aircraft or would slow their movement such that the flight deck door could be closed and locked prior to the person reaching the flight deck.

Unless explicitly identified as such, no statement herein is admitted as prior art merely by its inclusion in the Technological Field and/or Background section.

SUMMARY

Present aspects are directed to a deployable barrier in a vehicle cabin area that can be, for example, an aircraft cabin vestibule area, with the barrier formed by deploying a deployable attendant seat assembly from a stowed position to a deployed position, with the barrier in the deployed position configured to impede passage of a person from a cabin area, including from a vestibule area into a vehicle control deck that can be, for example, a flight deck in an aircraft.

A present aspect is directed to an aircraft cabin barrier with the aircraft cabin barrier including a deployable attendant seat assembly, with the deployable attendant seat assembly including a deployable attendant seat, and a movable back panel having a movable back panel first side and a movable back panel second side, with the movable back panel first side fixedly attached to the deployable attendant seat, and with the movable back panel configured to extend laterally from a movable back panel stowed position to a movable back deployed position. The aircraft cabin barrier further comprises an aircraft cabin first monument comprising an aircraft cabin first monument wall positioned immediately adjacent to the movable back panel when the movable back panel is in the movable back panel stowed position. The aircraft cabin barrier further includes a track assembly, with the track assembly including a track assembly first component and a track assembly second component, with the track assembly first component fixedly attached to the aircraft cabin first monument wall, with the track assembly second component fixedly attached to the movable back panel second side, and with the track assembly first component configured to movably engage with said track assembly second component. The said track assembly is configured to movably attach the movable back panel to the aircraft cabin first monument wall, with the track assembly further configured to control lateral movement of the movable back panel relative to the aircraft cabin first monument wall along a track path, with the track path extending between the movable back panel stowed position and the movable back panel deployed position, and with the track path further including a track path initial position and a track path extended position. The movable back panel further includes a movable back panel thickness extending from the movable back panel first side to the movable track panel second side, with the movable back panel including a through opening extending through the movable back panel thickness.

In another aspect, the track assembly includes a locking mechanism configured to maintain the movable back panel at a selected position along the track path.

In another aspect, the selected position along the track path is the track path extended position.

In a further aspect, the track path extended position is equivalent to the movable back panel deployed position.

In another aspect, the movable back panel is positioned adjacent to an aircraft cabin first monument wall when the movable back panel is in the movable back panel stowed position.

In another aspect, the movable back panel in the movable back panel stowed position is substantially within a first aircraft cabin monument footprint.

In another aspect, the movable back panel is integral with the deployable attendant seat.

In another aspect, the track assembly first component is integral with the aircraft cabin first monument wall.

In a further aspect, the track assembly second component is integral with the movable back panel second side.

In another aspect, the movable back panel comprises a movable back panel height selected to leave a gap between a movable back panel top edge and an aircraft cabin ceiling when the movable back panel is in the movable back panel deployed position, said gap comprising an average gap height ranging from about 1 inch to about 6 inches.

In another aspect, the track assembly is configured to lock when the movable back panel is in the movable back panel deployed position and the track assembly is in the extended track path position.

In another aspect, the movable back panel further comprises a movable back panel first leading vertical first edge and a movable back panel second trailing vertical edge, with the movable back panel configured to pivot radially at the movable back panel second trailing edge when the movable back panel is in the movable back panel deployed position and the track assembly is in the extended track path position.

In another aspect, the movable back panel first leading vertical edge includes a first mating component, with the first mating component configured to mate with a second mating component, said second mating component positioned at an aircraft cabin second monument outer surface of an aircraft cabin second monument, with the aircraft cabin second monument outer surface located at a selected distance from and across an aircraft cabin aisle from the aircraft cabin first monument wall.

In another aspect, the aircraft cabin second monument includes an extendible panel, with the extendible panel configured to deploy from an extendible panel stowed position adjacent the aircraft cabin second monument outer surface to an extendible panel deployed position, with the extendible panel including the second mating component.

In another aspect, the second mating component is configured to mate with the first mating component in a locked configuration.

In another aspect, the extendible panel in the extendible panel deployed position is configured to engage with the movable back panel in the movable back deployed position at an angle of approximately 90 degrees.

A present aspect is directed to an aircraft including an aircraft cabin, with the aircraft cabin including an aircraft cabin barrier, with the aircraft barrier cabin including a deployable attendant seat assembly, with the deployable attendant seat assembly including a deployable attendant seat, and a movable back panel having a movable back panel first side and a movable back panel second side, with the movable back panel first side fixedly attached to the deployable attendant seat, and with the movable back panel configured to extend laterally from a movable back panel stowed position to a movable back deployed position. The aircraft cabin barrier further comprises an aircraft cabin first monument comprising an aircraft cabin first monument wall positioned immediately adjacent to the movable back panel when the movable back panel is in the movable back panel stowed position. The aircraft cabin barrier further includes a track assembly, with the track assembly including a track assembly first component and a track assembly second component, with the track assembly first component fixedly attached to the aircraft cabin first monument wall, with the track assembly second component fixedly attached to the movable back panel second side, and with the track assembly first component configured to movably engage with said track assembly second component. The said track assembly is configured to movably attach the movable back panel to the aircraft cabin first monument wall, with the track assembly further configured to control lateral movement of the movable back panel relative to the aircraft cabin first monument wall along a track path, with the track path extending between the movable back panel stowed position and the movable back panel deployed position, and with the track path further including a track path initial position and a track path extended position. The movable back panel further includes a movable back panel thickness extending from the movable back panel first side to the movable track panel second side, with the movable back panel including a through opening extending through the movable back panel thickness.

A further present aspect is directed to an apparatus including a deployable attendant seat and a movable back panel having a movable back panel first side and a movable back panel second side with the movable back panel first side fixedly attached to the deployable attendant seat, with the movable back panel further including a through opening through extending from the moveable back panel first side to the movable back panel second side. The apparatus further includes a track assembly component, with the track assembly component fixedly attached to the movable back panel second side, and with the track assembly component configured to mate with a track assembly second component.

In another aspect, the movable back panel is integral with the deployable attendant seat.

In a further aspect, the track assembly component is integral with the movable back panel second side.

A further present aspect is directed to an aircraft comprising an aircraft cabin that includes the apparatus including a deployable attendant seat and a movable back panel having a movable back panel first side and a movable back panel second side with the movable back panel first side fixedly attached to the deployable attendant seat, with the movable back panel further including a through opening through extending from the moveable back panel first side to the movable back panel second side. The apparatus further includes a track assembly component, with the track assembly component fixedly attached to the movable back panel second side, and with the track assembly component configured to mate with a track assembly second component.

Another present aspect is directed to a method of controlling movement of passengers along an aisle within a cabin area of an aircraft, with the method including prior to opening a flight deck door, moving a barrier to a closed position with a flight deck being on a first side of the barrier and a passenger section of the cabin area being on a second side of the barrier, the barrier including a deployable attendant seat assembly, with the deployable attendant seat assembly including a deployable attendant seat, and a movable back panel having a movable back panel first side and a movable back panel second side, with the movable back panel first side fixedly attached to the deployable attendant seat, and with the movable back panel configured to extend laterally from a movable back panel stowed position to a movable back deployed position. The aircraft cabin barrier further comprises an aircraft cabin first monument comprising an aircraft cabin first monument wall positioned immediately adjacent to the movable back panel when the movable back panel is in the movable back panel stowed position. The aircraft cabin barrier further includes a track assembly, with the track assembly including a track assembly first component and a track assembly second component, with the track assembly first component fixedly attached to the aircraft cabin first monument wall, with the track assembly second component fixedly attached to the movable back panel second side, and with the track assembly first component configured to movably engage with said track assembly second component. The said track assembly is configured to movably attach the movable back panel to the aircraft cabin first monument wall, with the track assembly further configured to control lateral movement of the movable back panel relative to the aircraft cabin first monument wall along a track path, with the track path extending between the movable back panel stowed position and the movable back panel deployed position, and with the track path further including a track path initial position and a track path extended position. The movable back panel further includes a movable back panel thickness extending from the movable back panel first side to the movable track panel second side, with the movable back panel including a through opening extending through the movable back panel thickness. The method further includes locking the barrier in the closed position, and after locking the barrier, opening the flight deck door and providing access to flight personnel to a front section of the cabin area, said front section of the cabin area located at the first side of the barrier, and after providing access to the front section of the cabin area to the flight personnel, reclosing the flight deck door.

In another aspect, the method further includes monitoring a position of the barrier; and activating an indicator in the flight deck when the barrier is in the closed position.

The features, functions and advantages that have been discussed can be achieved independently in various aspects or may be combined in yet other aspects, further details of which can be seen with reference to the following description and the drawings.

BRIEF DESCRIPTION OF THE DRAWINGS

Figure 1:
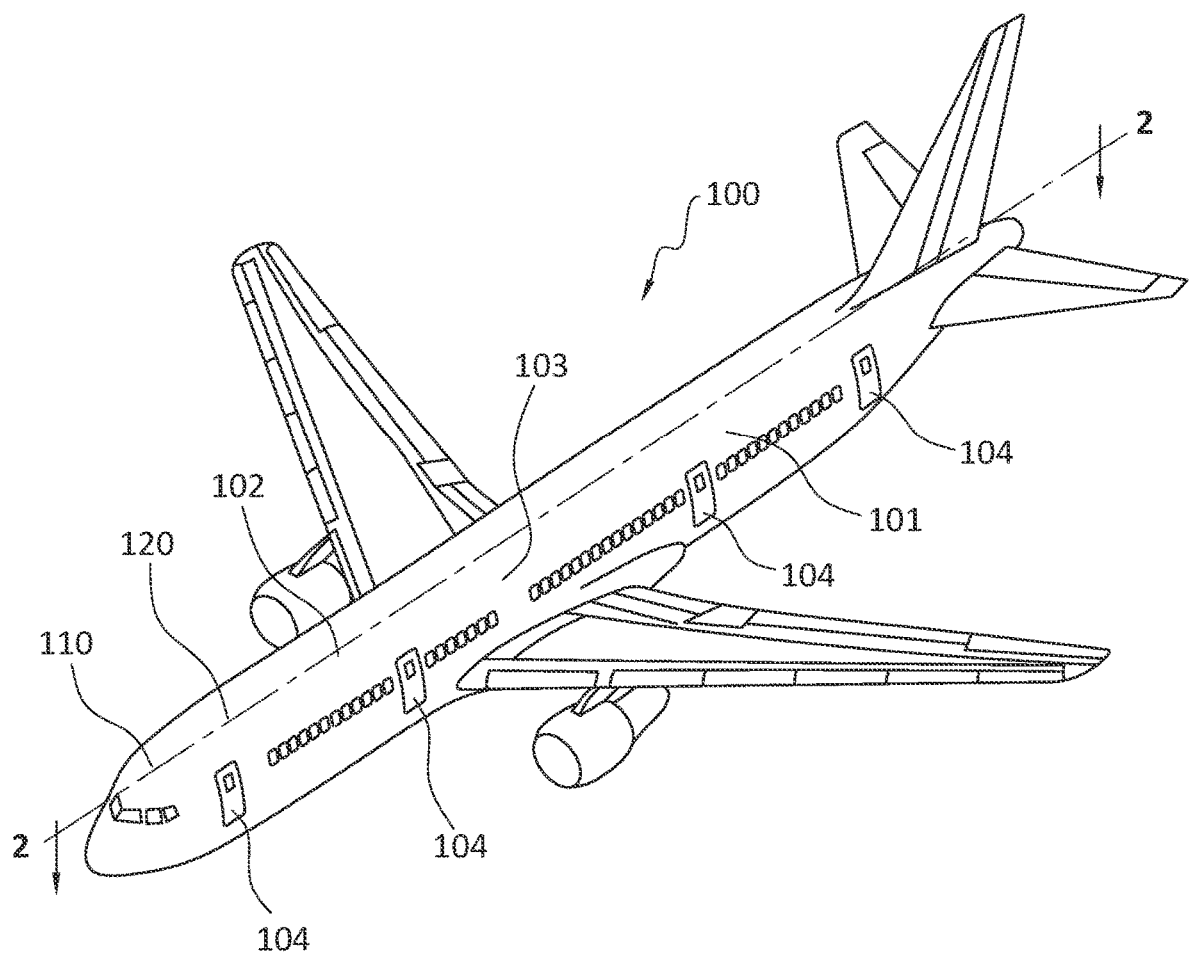
Figure 2:
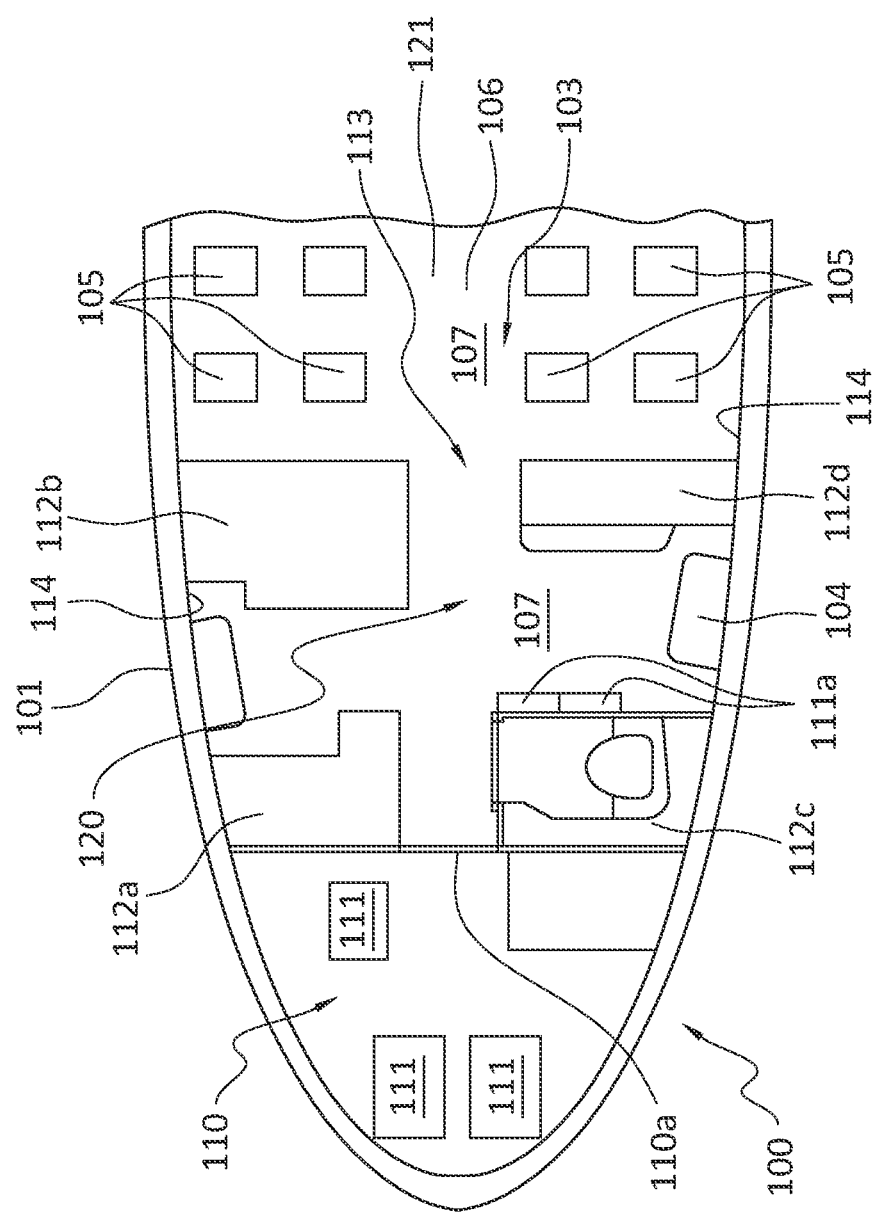
Figure 4A:
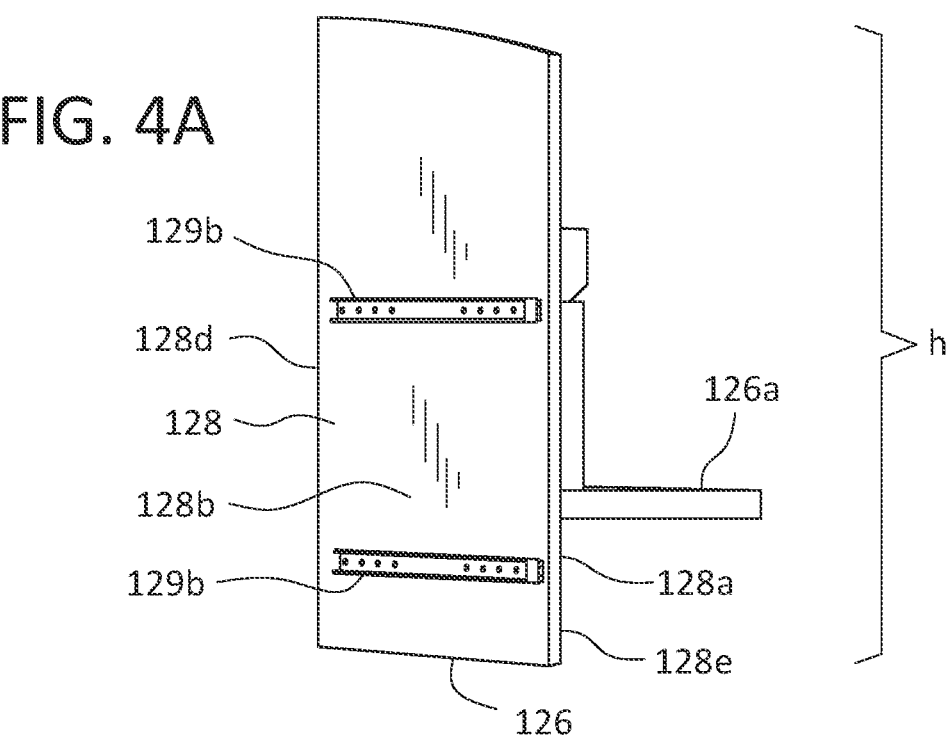
Figure 4B:
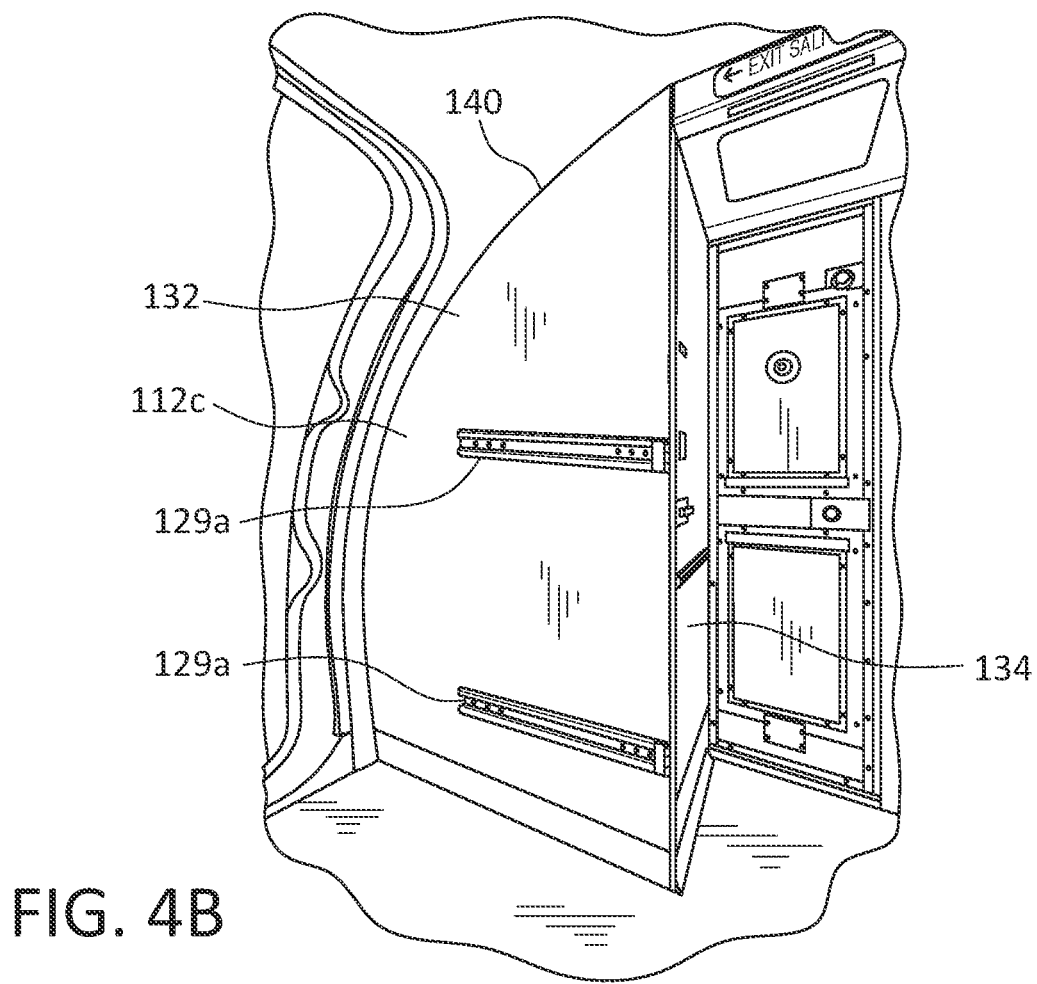
Figure 5:
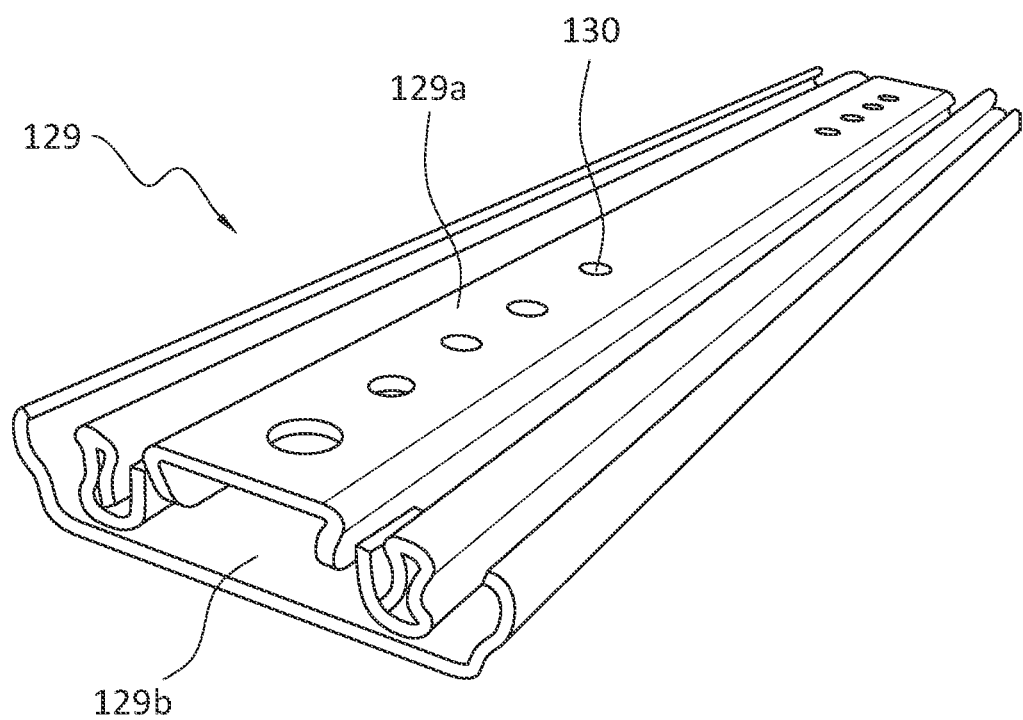
Figure 6A:
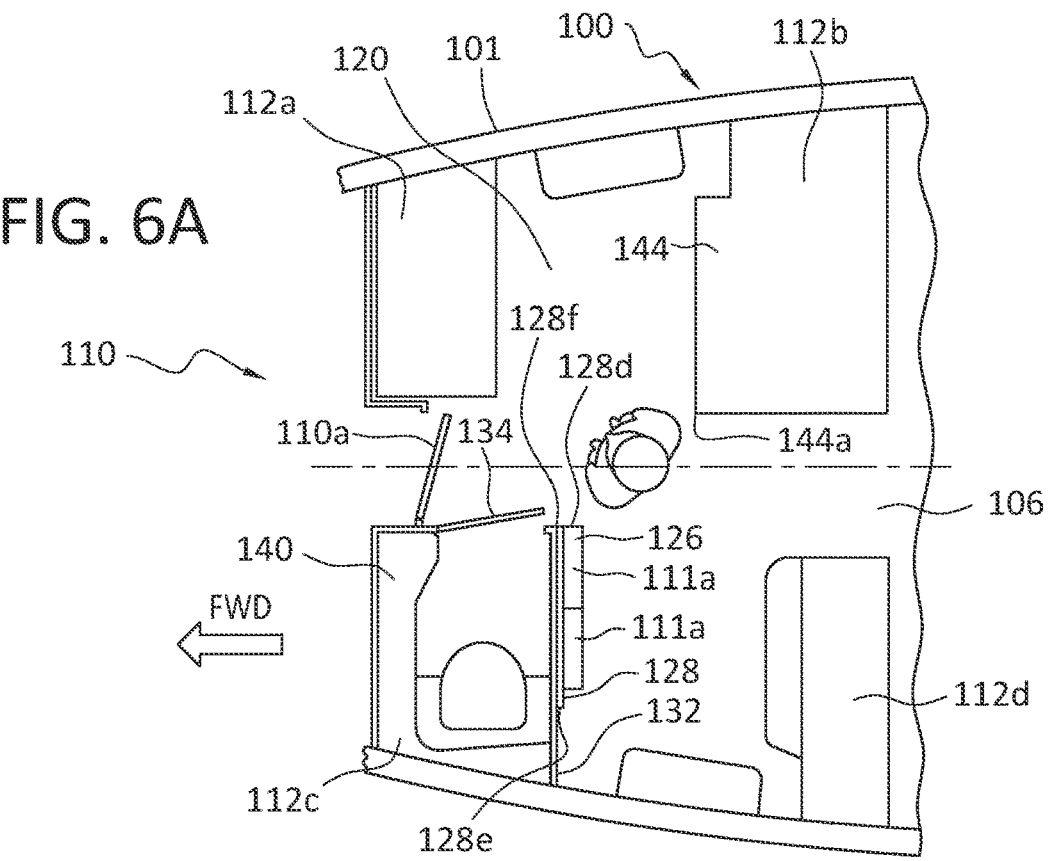
Figure 6B:
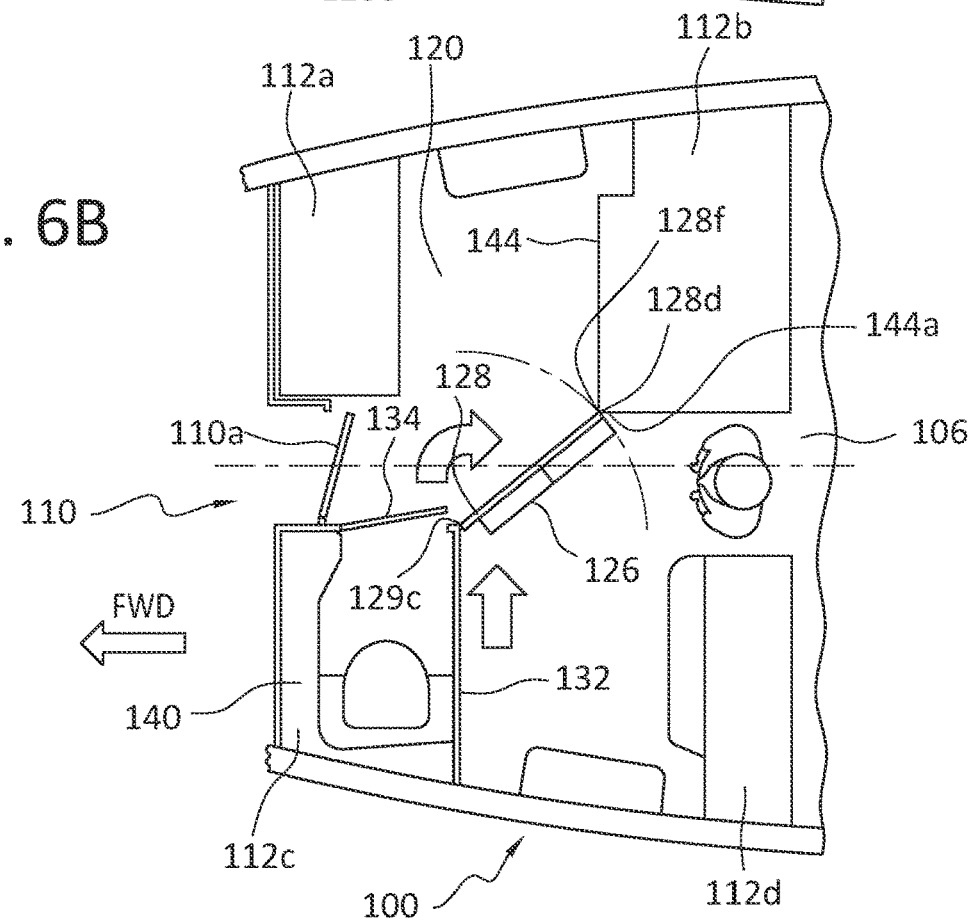
Figure 6C:
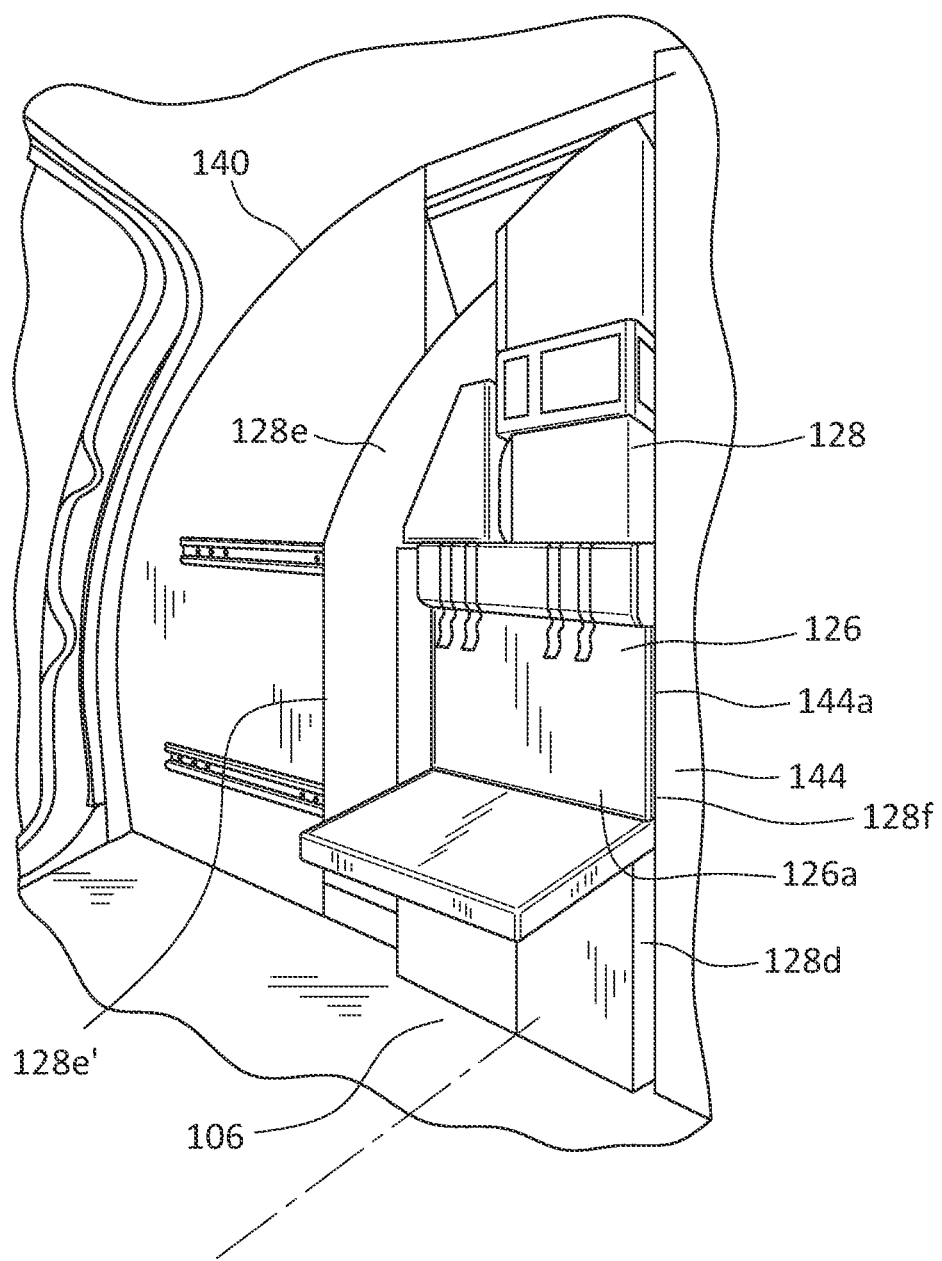
Figure 9:
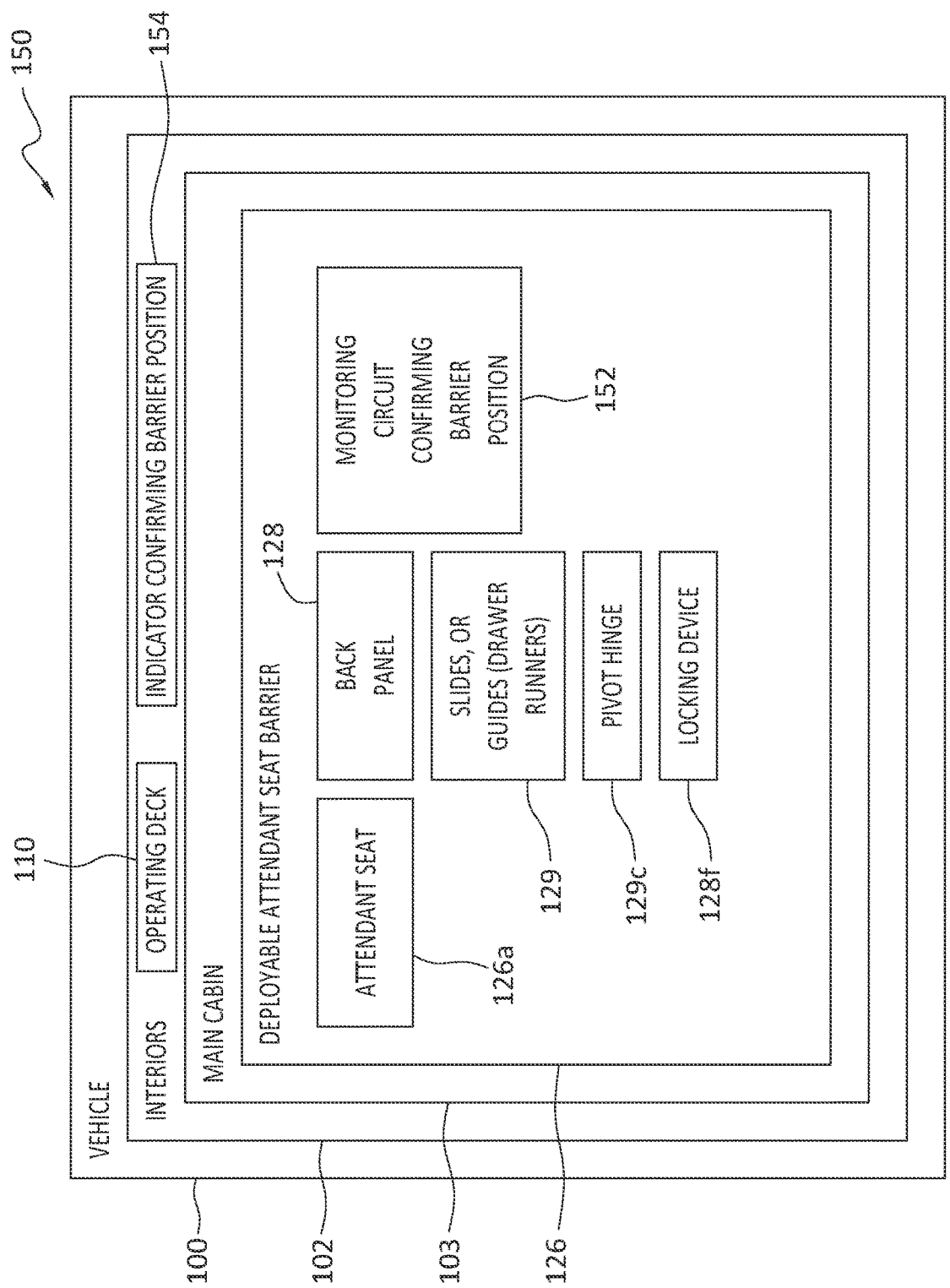
Figure 10:
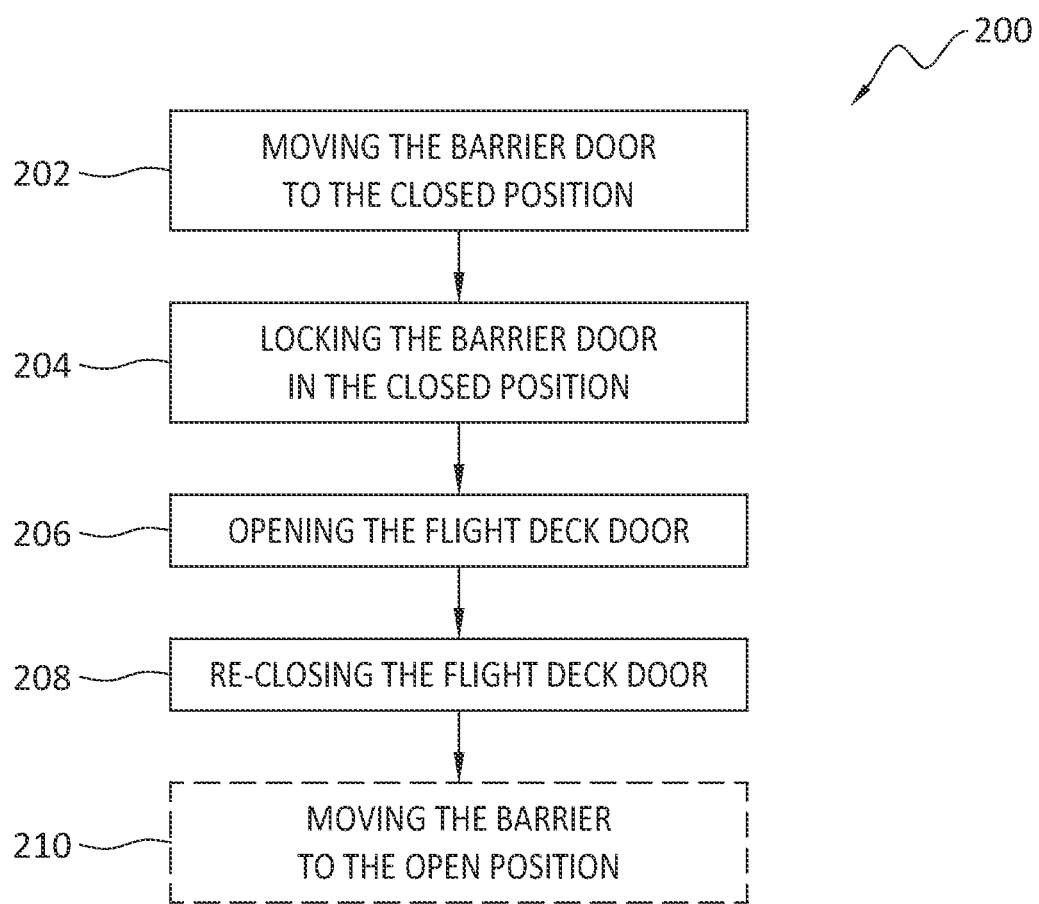
Figure 11:
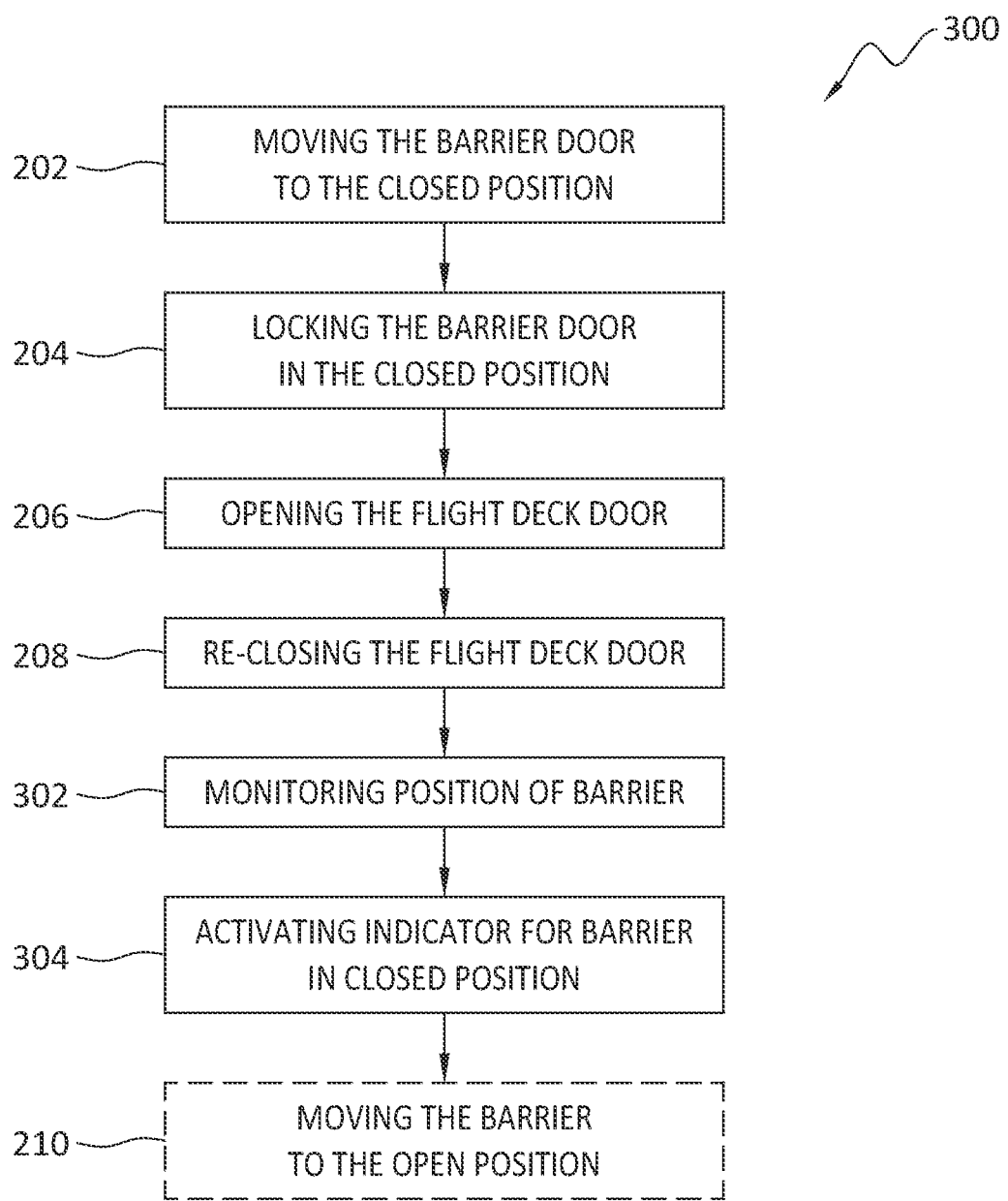
Figure 12:
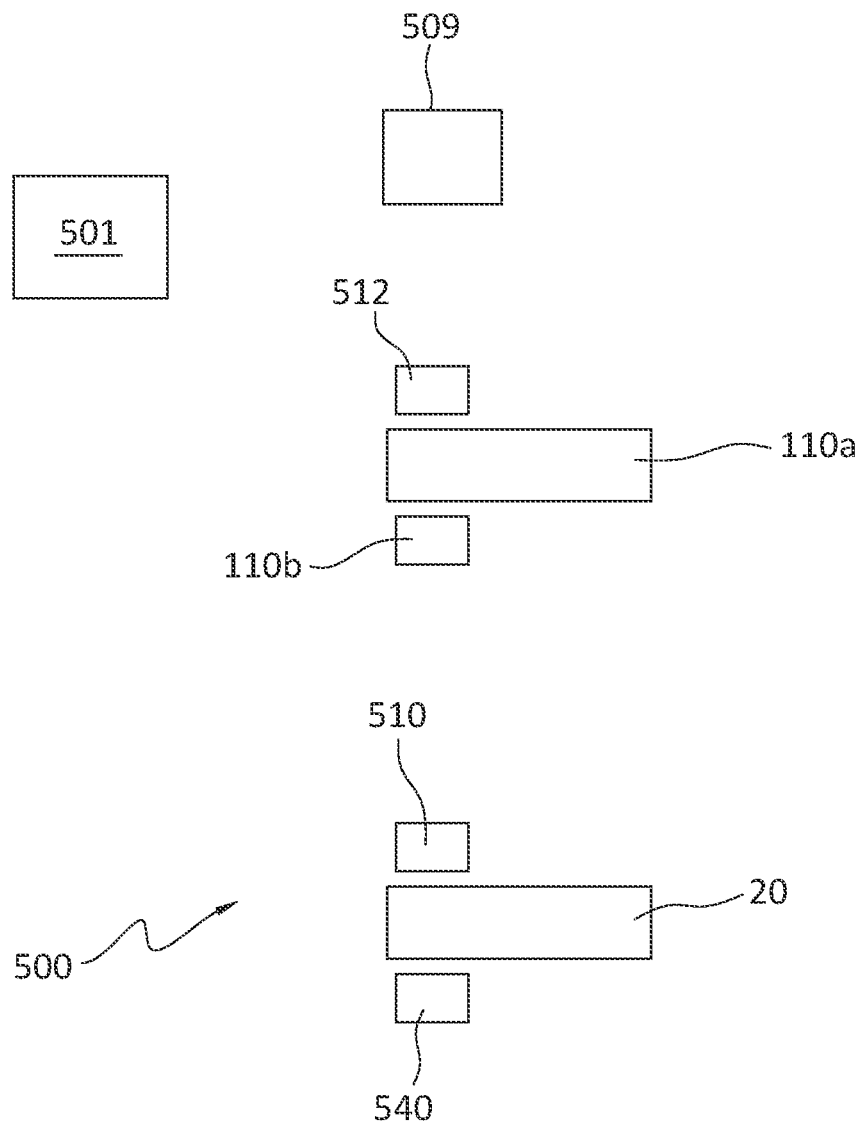
Figure 13:
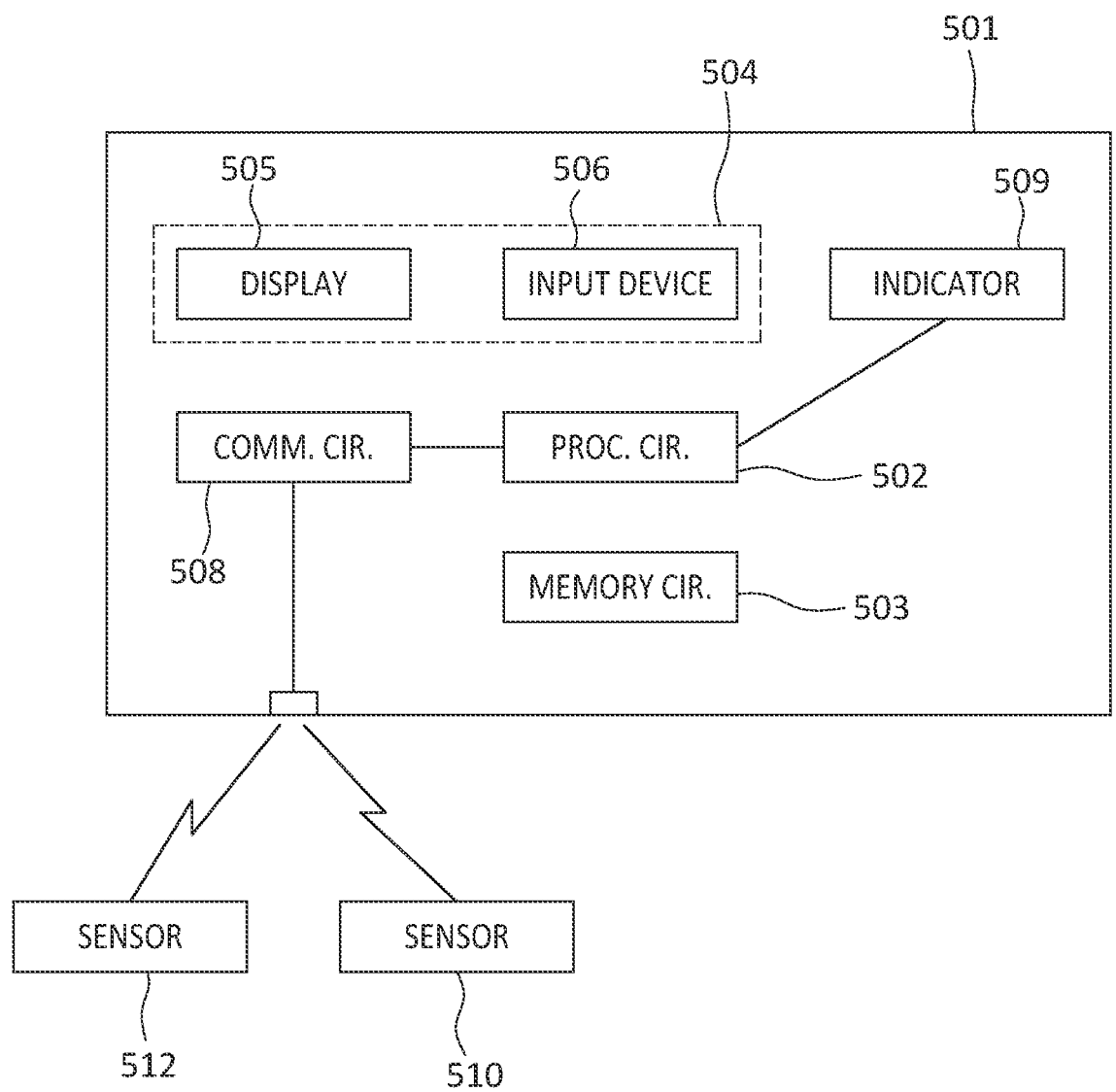

Having thus described variations of the disclosure in general terms, reference will now be made to the accompanying drawings, which are not necessarily drawn to scale, and wherein:

FIG. 1 is an illustration of a vehicle in the form of an aircraft, according to present aspects;

FIG. 2 is an overhead cross-sectional partial view of an aircraft cabin of the type found within the exemplary vehicle in the form of the aircraft shown in FIG. 1 taken along line 2-2, according to present aspects;

FIG. 3A is a partial forward view of a flight deck door and lavatory monument as viewed from a vestibule within an aircraft cabin of the type found within the exemplary vehicle in the form of the aircraft shown in FIG. 1, according to present aspects;

FIG. 3B is a partial forward view of a flight deck door and lavatory monument as viewed from a vestibule within an aircraft cabin of the type found within the exemplary vehicle in the form of the aircraft shown in FIG. 1, according to present aspects;

FIG. 4A is a back view of a deployable attendant seat assembly component, according to present aspects;

FIG. 4B is a view of a cabin section depicting lavatory and flight doors, according to present aspects;

FIG. 5 is an enlarged perspective view of a track assembly in a mated configuration, according to present aspects;

FIG. 6A is an overhead partial view of a vestibule in an aircraft cabin of the type found within the exemplary aircraft shown in FIG. 1, according to present aspects;

FIG. 6B is an overhead partial view of a vestibule in an aircraft cabin of the type found within the exemplary aircraft shown in FIG. 1, according to present aspects;

FIG. 6C is a partial forward view of a deployable attendant seat in a deployed position as viewed from a vestibule in an aircraft cabin of the type found within the exemplary aircraft shown in FIG. 1, according to present aspects;

FIG. 7A is an overhead partial view of a vestibule in an aircraft cabin of the type found within the exemplary aircraft shown in FIG. 1, according to present aspects;

FIG. 7B is an overhead partial view of a vestibule in an aircraft cabin of the type found within the exemplary aircraft shown in FIG. 1, according to present aspects;

FIG. 8A is an overhead partial view of a vestibule in an aircraft cabin of the type found within the exemplary aircraft shown in FIG. 1, according to present aspects;

FIG. 8B is an overhead partial view of a vestibule in an aircraft cabin of the type found within the exemplary aircraft shown in FIG. 1, according to present aspects;

FIG. 9 is a block diagram outlining a vehicle, according to present aspects;

FIG. 10 is a flowchart outlining a method, according to present aspects;

FIG. 11 is a flowchart outlining a method, according to present aspects;

FIG. 12 is a schematic drawing of a monitoring system according to present aspects; and FIG. 13 is a schematic box drawing of a monitoring system, according to present aspects.

DETAILED DESCRIPTION

According to present aspects, an aircraft cabin barrier is disclosed to control and restrict the passage of persons onto a flight deck from a passenger cabin section or from within a vestibule area. The barrier is formed through the deployment of an attendant seat assembly from a stowed position immediately adjacent to a monument wall to a deployed position extending away from the monument into the vestibule and across an aisle within the vestibule.

Present aspects afford significant advantages regarding the formation and use of the presently converted and presently modified attendant seat assembly as an additional or secondary barrier to the flight deck. Such advantages include, without limitation, the use of existing aircraft cabin structures for the formation of a secondary barrier, such that almost no additional weight is added to the aircraft configured to include the presently disclosed barriers that can be secondary barriers. In addition, retrofitting processes configured to include/add the presently disclosed barriers into an aircraft cabin and into aircraft comprising the barrier are significantly simplified as minimal hardware is required to convert an aircraft attendant seat into the presently disclosed deployable attendant seat assembly barriers, without adding significant weight or cost.

According to present aspects, FIGS. 1 and 2 illustrate a vehicle in the form of an aircraft 100 that includes a fuselage 101. FIG. 2 is a partial cross-sectional view of aircraft 100 taken across line 2-2. As shown in FIG. 2, a flight deck 110 is positioned at a front, or forward section, of the fuselage 101 and a cabin area 103 is positioned rearward (referred to equivalently herein as "aft"). The cabin area 103 is equipped for accommodating passengers. The size of the flight deck 110 and the cabin area 103 can vary depending upon the aircraft 100. One or more doors 104 provide for passengers to enter and exit the aircraft 100.

The flight deck 110 includes one or more crew seats 111 for the flight personnel including the pilot, co-pilot, and navigator. Various controls and instrument panels (not illustrated) are located for use by the pilot and co-pilot to control the aircraft 100.

The cabin area 103 is positioned along the fuselage 101 aft of the flight deck 110. The cabin area 103 includes a passenger section 121 with passenger seats 105 arranged in rows along one or more aisles 106. In some examples, including, for example, a commercial airline, the passenger seats 105 extend throughout the cabin area 103. In other examples in which the aircraft 100 is used for cargo transport, a limited number of passenger seats 105 are positioned in the cabin area 103.

The cabin area 103 also includes a vestibule 120 positioned between the flight deck 110 and the passenger section 121. In some examples, the vestibule 120 includes crew seats 111a for use by flight personnel such as flight attendants. The crew seats 111a can fold to be out of the way when not being used. The vestibule 120 includes one or more monuments 112 that are mounted to the structural members of the aircraft 100 within the fuselage 101. The monuments 112 are functional units used during flight with examples including but not limited to galleys, lavatories, and stowage units. In some examples, the monuments 112 are shaped and sized to extend from the floor 107 to the ceiling 108 (shown in FIGS. 3A and 3B) of the cabin area 103. In some examples, the monuments 112 extend between a wall 114 of the fuselage 101 to an aisle 106. FIG. 2 further shows the vestibule 120 including a pair of galley monuments 112a, 112b, a lavatory monument 112c, and a stowage monument 112d that can be, for example, a closet.

A flight deck door 110a separates the flight deck 110 from the cabin area 103, and specifically separates the flight deck 110 from the vestibule 120. The flight deck door 110a prevents unintended persons from entering the flight deck 110 from the cabin area 103. FIG. 2 further illustrates an example with the opening 113 formed between a pair of monuments 112b, 112d. The opening 113 can be aligned with an aisle 106 to facilitate movement of passengers during boarding and exiting. The cabin area 103 further includes an opening 113 for passengers and flight personnel to pass through when moving between the vestibule 120 and the passenger section 121. The opening 113 can be formed between various components, such as monuments 112a, 112b, 112c, 112d, walls 114 of the fuselage 101, and passenger seats 105.

FIGS. 3A and 3B are views from within aircraft cabin 103 generally, and from within a vestibule 120 facing forward toward the closed flight deck door 110a. As illustrated in FIGS. 3A and 3B, the flight deck door 110a includes a flight deck door lock 110b configured to secure the flight deck door 110a when closed. The flight deck door lock 110b can include various configurations for unlocking, such as a magnetic card reader and input buttons. A viewing hole 110c provides for the flight personnel on the flight deck 110 to see into the cabin area 103 without opening the flight deck door 110a. In some examples, the flight deck door 110a is mounted in a frame that mounts onto one or more of the monuments 112, floor 107, and ceiling 108.

FIGS. 3A and 3B further show a lavatory monument 112c that is also referred to herein as the aircraft cabin first monument 140 comprising a lavatory door 134 and further comprising an aircraft cabin first monument wall 132 to which is attached the deployable attendant seat assembly that is shown in greater detail in subsequent FIGS. presented herein and described more fully. Crew seat 111a is shown in a stowed position and is attached to a movable back panel that is positioned immediately adjacent to the lavatory wall that is referred to herein equivalently as the aircraft cabin first monument wall 132.

According to present aspects, the attendant seat is fixedly attached to, or configured to be integral with, a back panel. The back panel is maintained in a movable configuration with and relative to an aircraft cabin first monument wall (e.g., shown in the FIGS. as an aircraft lavatory monument wall, and is therefore equivalently referred to herein as a movable back panel. The attendant seat in combination with the movable back panel form a deployable attendant seat assembly. The attendant seat in combination with the fixedly attached movable back panel is configured to serve as the presently described aircraft cabin barrier when the deployable attendant seat assembly is positioned in the deployed state (referred to equivalently herein as the deployed attendant seat assembly deployed position). According to present aspects, the attendant seat portion of the deployable attendant seat assembly is configured to serve a dual function of an attendant seat (at least when the attendant seat assembly is in a stowed configuration and located proximate to the aircraft cabin first monument wall), and also as an aircraft cabin barrier when the deployable attendant seat assembly is moved into a deployable position that traverses an aisle, and is 1) locked in a deployed position that is at least in close proximity to an aircraft cabin second monument or 2) received by and engaged with an aircraft cabin second monument in a locked configuration.

FIGS. 4A and 4B illustrate the movable association between the deployable attendant seat assembly and the aircraft first monument wall. As shown in FIGS. 4A and 4B, the deployable attendant seat assembly 126 comprises attendant seat 126a fixedly attached to movable back panel first side 128a of movable back panel 128. FIG. 4A further shows a view of the movable back panel second side 128b that further comprises a fixedly attached track assembly second component 129b. In some examples, the track assembly second component can be integral with the movable back panel 128 as a unitary part. The movable back panel 128 further comprises a movable back panel leading vertical first edge 128d and a movable back panel trailing vertical second edge 128e. Movable back panel 128 can further comprise a movable back panel through opening extending through the thickness of the movable back panel and extending from the movable back panel first side 128a to the movable back panel second side 128b. The movable back panel has a selected height "h" According to a present aspect, when the movable back panel is moved into a deployed position to function as a barrier, the movable back panel height "h" can be less than the distance from an aircraft cabin floor to the aircraft cabin ceiling, and leaving a gap between the top edge of the movable back panel and the aircraft cabin ceiling. The gap that can exist between the top of the back panel and the ceiling in the deployed barrier position can be any dimension, so long as the gap is smaller than would allow a person to traverse the barrier through the gap. According to present aspects, the gap formed can be of a regular or irregular geometry where the maximum width of the gap is less than about 1 foot, and further ranges from about 2 inches to about 8 inches.

When the deployable attendant seat assembly is in a stowed position, the movable back panel is movably engaged with and positioned immediately adjacent to the aircraft cabin first monument wall. As shown in FIG. 4B, the aircraft cabin first monument 140 can be lavatory monument 112c, with the first monument 140 comprising aircraft cabin first monument wall 132 and lavatory first monument door 134. The first monument wall 132 (against which the movable back panel 128 is positioned in the stowed configuration) further comprises a fixedly attached track assembly first component 129a that is dimensioned and configured to mate in a movable association with track assembly second component 129b that is attached to the movable back panel second side (with track portion attached) 128b, and shown in FIG. 4A. In some examples, the track assembly first component 129a can be integral with the movable back panel 128 as a unitary part.

The movable back panel is movably attached to the aircraft cabin monument wall through the engagement and mated orientation of the track assembly first and second components 129a, 129b to form the mated track assembly 129. FIG. 5 shows a non-limiting example of track assembly 129 showing the mating (e.g. mated engagement and cooperation thereof) of the first and second track assembly components 129a, 129b. Either or both of the first and second track assembly components 129a, 129b can further comprise one or more cooperating locking features 130 so that the track assembly 129 can be extended to one or more extended lengths from an initial position to an extended position along a track path that can be maintained and locked to a selected track path length. The selected track path length is configured to be a length that is sufficient to extend across an aircraft aisle so that the deployable attendant seat assembly can contact and be received by, or can otherwise be located in close proximity with an aircraft cabin second monument located across an aisle from the aircraft cabin first monument for the purpose of establishing a deployable attendant seat assembly barrier.

According to present aspects, the deployable attendant seat assembly 126 can be deployed to form a barrier such as for example, an aircraft cabin barrier within, for example, an aircraft cabin and form: 1) a lockable barrier itself that extends from a stowed position in communication with an aircraft first monument and is robust enough (without securing a back panel leading edge to another structure) to impede passage of a person along an aircraft aisle; 2) a lockable barrier that contacts an aircraft second monument located across an aisle from the aircraft first monument; and/or 3) a lockable barrier that contacts a panel in communication with an aircraft second monument located across an aisle from the aircraft first monument, with the panel extending a selected from and remaining in contact with the aircraft second monument.

FIGS. 6A, 6B, 6C, 7A, 7B, 8A, and 8B show non-limiting examples, according to present aspects, of establishing a cabin barrier through the deployment of the deployable attendant seat assembly from a stowed position to a deployed position to establish the barrier. FIG. 6A shows an overhead view of a vestibule 120 that can be in the form of an aircraft cabin of an aircraft of the type shown at least in FIGS. 1, 2, 3A, and 3B. As shown in FIG. 6A, a plurality of aircraft cabin monuments 112a, 112b, 112c, 112d are located within an aircraft vestibule 120. In one example, as further shown in FIG. 6A, lavatory monument 112c is referred to also as aircraft cabin first monument 140, and galley monument 112b is referred to also as aircraft second monument 144. Deployable attendant seat assembly 126 is shown in a stowed position and positioned immediately adjacent to aircraft first monument wall 132. When the establishment of an additional barrier to entry of an area within vestibule 120 is desired, (e.g., a barrier to impede entry into vestibule 120 and toward flight deck door 110a of flight deck 110, the deployable attendant seat barrier is moved laterally from a stowed position shown in FIG. 6A in a direction substantially parallel to aircraft first monument wall 132 and to a position that encumbers and otherwise obstructs passage of a person through vestibule 120 in a forward direction by traversing aisle 106. Though not visible in FIGS. 6A and 6B, the track assembly that movable joins the deployable attendant seat assembly to the aircraft cabin first monument wall facilitates the lateral movement of the movable back panel and the entire deployable attendant seat assembly along a track path from an initial track path position in the stowed position to an extended track path position. At the extended track path position, the track assembly first and second components that mate to form the track assembly reach the maximum extended track position and engage with one another to achieve a hinged connection that allows the deployable attendant seat assembly to pivot about the track assembly hinge 129c.

As shown in FIG. 6B, the deployable attendant seat assembly is configured to pivot toward aircraft second monument 144 (that, as shown in FIGS. 6A and 6B is located at a position in the aircraft cabin vestibule that is diagonally across the aisle 106 from the aircraft first monument, according to a present example) until contact or near contact is achieved with the aircraft second monument. If a locking arrangement between the deployable attendant seat assembly and the aircraft second monument is selected, the movable back panel leading vertical first edge 128d of the deployable attendant seat assembly 126 can comprise a leading first edge mating component 128f configured to mate with a second mating component 144a of the aircraft second monument 144. In one example, as shown in FIG. 6B, the first and second mating components 128f and 144a can lock. In another example, as shown in FIG. 6B, when the leading first edge mating component 128f contacts (and, if selected, locks with) the second mating component 144a, a circuit can be completed and a monitoring device can signal, for example, a controller or other device in communication with one or more of the mating components 128f, 144a, with the signal configured to activate an indicator (that can be located, for example within the flight deck) alerting personnel and/or crew that the deployable attendant seat assembly has been successfully deployed into a barrier configuration that can be a locked barrier configuration.

FIG. 6C shows the deployable attendant seat assembly 126 deployed into the deployed position to engage aircraft second monument 144 with movable back panel leading vertical first edge 128d and leading first edge mating component 128f contacting the second mating component 144a of aircraft second monument 144. The movable back panel can include a movable back panel through opening (not shown) that extends through the thickness of the movable back panel allowing visual access from a position aft of the deployed seat assembly barrier into the portion of the vestibule that is now blocked and that is positioned forward of the established barrier. Such a through opening may not be selected, as a line of sight and visual access from aft of the barrier to a region forward of the barrier can be established as a result of a gap existing between the upper edge of the barrier and a ceiling.

In addition, as shown in FIG. 6B, as the movable back panel 128 fully deploys to a barrier configuration with the movable back panel "sliding" via the track assembly as far inboard as possible, the movable back panel trailing vertical second edge 128e (e.g., the "outboard edge") of the movable back panel 128 can comprise a vertical "flat" region 128e' at the to facilitate the pivoting motion, if desired, of the movable back panel into a fully deployed position as a barrier.

FIGS. 7A and 7B show a further present aspect where the deployable attendant seat assembly is deployed and configured to form and otherwise establish a barrier across an aircraft aisle by becoming a component of and otherwise forming a deployable barrier that contacts a panel in communication with an aircraft second monument located across an aisle from the aircraft first monument, with the panel extending a selected distance from and remaining in contact with the aircraft second monument. As shown in FIG. 7A, a plurality of aircraft cabin monuments 112a, 112b, 112c, 112d are located within an aircraft vestibule 120. In one example, as further shown in FIG. 7A, lavatory monument 112c is referred to also as aircraft cabin first monument 140, and galley monument 112a is referred to also as aircraft second monument 144. Deployable attendant seat assembly 126 is shown in a stowed position and positioned immediately adjacent to aircraft first monument wall 132. When the establishment of an additional barrier to entry of an area within vestibule 120 is desired, (e.g., a barrier to impede entry of a person along an aisle and into vestibule 120 and toward flight deck door 110a of flight deck 110, the deployable attendant seat barrier is moved laterally from a stowed position shown in FIG. 7A in a direction substantially parallel to aircraft first monument wall 132 and to a position that encumbers and otherwise obstructs passage of a person through vestibule 120 in a forward direction by traversing aisle 106. FIG. 7A further shows an extendable second monument panel 146 in communication with aircraft second monument 144, and in a stowed position where the second monument panel 146 can rest immediately adjacent to and can be secured to an outer surface and/or outer wall of the aircraft second monument 144 in the stowed configuration.

Though not visible in FIGS. 7A and 7B, the track assembly that movable joins the deployable attendant seat assembly to the aircraft cabin first monument wall facilitates the lateral movement of the movable back panel and the entire deployable attendant seat assembly along a track path from an initial track path position in the stowed position to an extended track path position. At the extended track path position, the track assembly first and second components that mate to form the track assembly reach the maximum extended track position and can engage with one another to achieve a hinged connection that allows the deployable attendant seat assembly to pivot about the hinge. According to the present aspect illustrated in FIGS. 7A and 7B, the deployable attendant seat assembly moved into the deployed position (shown in FIG. 7B) need not pivot about the hinge.

As shown in FIG. 7B, the deployable attendant seat assembly is configured extend, in the deployed position across aisle 106 toward aircraft second monument 144 (that, as shown in FIGS. 7A and 7B is located at a position in the aircraft cabin vestibule that is substantially directly across the aisle 106 from the aircraft first monument, according to a present example) until contact or near contact is achieved with the aircraft second monument panel 146, that has been unfolded and, for example, made to pivot about second monument panel hinge 146a (e.g., deployed or moved from a stowed state to a deployed state) and away from second aircraft monument 144. If a locking arrangement between the deployable attendant seat assembly 126 and the aircraft second monument panel 146 is selected, the movable back panel leading vertical first edge 128d of the deployable attendant seat assembly 126 can comprise a leading first edge mating component 128f configured to mate with a second mating component 144a of the aircraft second monument 144.

In one example, as shown in FIG. 7B, the first and second mating components 128f and 144a can lock. In one example, when the leading first mating component 128f contacts (and, if selected, locks with) the second mating component 144a, a circuit can be completed and a monitoring device can signal, for example, a controller or other device in communication with one or more of the mating components, with the signal configured to activate an indicator (that can be located, for example within the flight deck) alerting personnel and/or crew that the deployable attendant seat assembly has been successfully deployed into a barrier configuration that can be a locked barrier configuration.

In another example, FIGS. 8A and 8B show a further present aspect where the deployable attendant seat assembly is deployed and configured to form and otherwise establish a barrier across an aircraft aisle by becoming a component of and otherwise forming a deployable barrier that contacts a panel in communication with an aircraft second monument located across an aisle from the aircraft first monument, with the panel extending a selected from and remaining in contact with the aircraft second monument. As shown in FIG. 8A, a plurality of aircraft cabin monuments 112a, 112b, 112c, 112d are located within an aircraft vestibule 120. In one example, as further shown in FIG. 8A, lavatory monument 112c is referred to also as aircraft cabin first monument 140, and a galley monument 112a is referred to also as aircraft second monument 144.

The galley monument 112a, 144 shown in FIGS. 8A and 8B differs from the galley monument configuration shown in FIGS. 7A and 7B. That is, the galley monument footprint 112a, 144 shown in FIGS. 8A and 8B differs from the galley monument footprint shown in FIGS. 7A and 7B. The larger galley footprint shown in FIGS. 8A and 8B allows a portion of the galley monument wall to be located at a point that is substantially perpendicular to and that will contact the deployable attendant seat assembly in the deployed position, obviating the presence of a second monument panel of the type presented in FIGS. 7A and 7B.

As shown in FIG. 8A, deployable attendant seat assembly 126 is shown in a stowed position and positioned immediately adjacent to aircraft first monument wall 132. When the establishment of an additional barrier to entry of an area within vestibule 120 is desired, (e.g., a barrier to impede entry of a person along aisle 106, further into a forward position within vestibule 120, and toward flight deck door 110a of flight deck 110, the deployable attendant seat barrier is moved laterally from a stowed position shown in FIG. 7A in a direction substantially parallel to aircraft first monument wall 132 and to a deployed position that encumbers and otherwise obstructs passage of a person through vestibule 120 in a forward direction by traversing aisle 106.

Though not visible in FIGS. 8A and 8B, the track assembly that movable joins the deployable attendant seat assembly to the aircraft cabin first monument wall facilitates the lateral movement of the movable back panel and the entire deployable attendant seat assembly along a track path from an initial track path position in the stowed position to an extended track path position. At the extended track path position, the track assembly first and second components that mate to form the track assembly reach the maximum extended track position and can engage with one another to achieve a hinged connection that allows the deployable attendant seat assembly to pivot about the hinge. According to the present aspect illustrated in FIGS. 8A and 8B, the deployable attendant seat assembly moved into the deployed position (shown in FIG. 8B) need not pivot about the hinge.

As shown in FIG. 8B, the deployable attendant seat assembly is configured to extend, in the deployed position across aisle 106 toward aircraft second monument 144 (that, as shown in FIGS. 8A and 8B is located at a position in the aircraft cabin vestibule that is substantially directly across the aisle 106 from the aircraft first monument, according to a present example) until contact or near contact is achieved with the aircraft second monument 144. If a locking arrangement between the deployable attendant seat assembly 126 and the aircraft second monument 144 is selected, the movable back panel leading vertical first edge 128d of the deployable attendant seat assembly 126 can comprise a leading first edge mating component 128f configured to mate with a second mating component 144a of the aircraft second monument 144.

In one example, as shown in FIG. 8B, the first and second mating components 128f and 144a can lock. According to present aspects, when the leading first mating component 128f contacts (and, if selected, locks with) the second mating component 144a of aircraft second monument 144, a circuit can be completed and a monitoring device can signal, for example, a controller or other device in communication with one or more of the mating components, with the signal configured to activate an indicator (that can be located, for example within the flight deck) alerting personnel and/or crew that the deployable attendant seat assembly has been successfully deployed into a barrier configuration that can be a locked barrier configuration.

Although not shown in FIGS. 7A, 7B, 8A, 8B, the movable back panel 128 of the deployable attendant seat assembly 126 comprises a movable back panel through opening 128c that extends through the thickness of the movable back panel (from the movable back panel first side to the movable back panel second side) allowing visual access from a position aft of the deployed seat assembly barrier into the portion of the vestibule that is now blocked and that is positioned forward of the established barrier.

FIG. 9 is a block diagram 150 further illustrating present aspects where a vehicle 100 that can be in the form of an aircraft comprises an interior area 102 within a fuselage that contains an operation center that can be a flight deck when the vehicle is in the form of an aircraft. The vehicle further comprises a main cabin area 103 that further comprises a deployable attendant seat barrier 126. The deployable attendant seat barrier, according to present aspects, comprises an attendant seat 126a fixedly attached to a back panel 128 that has attached track assembly component that can be in the form of a component of a cooperating slide, guide, runner, etc. 129a and that is configured to engage or be brought into a cooperating configuration with a track assembly component located on an aircraft first monument to which the back panel is then movably engaged. The deployable attendant seat handle is understood to further comprise components of a locking device that can be a movable back panel first leading edge mating component 128f configured to engage with, for example, an aircraft cabin second monument second mating component. The deployable attendant seat assembly can further comprise components of a monitoring circuit 152 configured to signal, for example, a controller or other device in communication with one or more of the mating components, with the signal configured to activate an indicator 154 (that can be located, for example within the flight deck 110) alerting personnel and/or crew that the deployable attendant seat assembly has been successfully deployed into a barrier configuration that can be a locked barrier configuration.

FIGS. 10 and 11 are flowcharts outlining methods, according to present aspects, FIG. 10 outlines a method 200 of controlling movement of passengers along an aisle within a cabin area of an aircraft, with the method including prior to opening a flight deck door, moving 202 a barrier to a closed position with a flight deck being on a first side of the barrier and a passenger section of the cabin area being on a second side of the barrier, the barrier including a deployable attendant seat assembly, with the deployable attendant seat assembly including a deployable attendant seat, and a movable back panel having a movable back panel first side and a movable back panel second side, with the movable back panel first side fixedly attached to the deployable attendant seat, and with the movable back panel configured to extend laterally from a movable back panel stowed position to a movable back deployed position. The aircraft cabin barrier further comprises an aircraft cabin first monument comprising an aircraft cabin first monument wall positioned immediately adjacent to the movable back panel when the movable back panel is in the movable back panel stowed position. The aircraft cabin barrier further includes a track assembly, with the track assembly including a track assembly first component and a track assembly second component, with the track assembly first component fixedly attached to the aircraft cabin first monument wall, with the track assembly second component fixedly attached to the movable back panel second side, and with the track assembly first component configured to movably engage with said track assembly second component. The said track assembly is configured to movably attach the movable back panel to the aircraft cabin first monument wall, with the track assembly further configured to control lateral movement of the movable back panel relative to the aircraft cabin first monument wall along a track path, with the track path extending between the movable back panel stowed position and the movable back panel deployed position, and with the track path further including a track path initial position and a track path extended position. The movable back panel further includes a movable back panel thickness extending from the movable back panel first side to the movable track panel second side, with the movable back panel including a through opening extending through the movable back panel thickness. The method further includes locking 204 the barrier in the closed position, and after locking the barrier, opening 206 the flight deck door and providing access to flight personnel to a front section of the cabin area, with the front section of the cabin area located at the first side of the barrier, and after providing access to the front section of the cabin area to the flight personnel, reclosing 208 the flight deck door. FIG. 10 optionally further comprises returning the deployed (deployable) attendant seat assembly from the barrier configuration toward a stowed position by moving 210 the barrier to an open position.

FIG. 11 outlines a method 300 that comprises the stages described in method 200 shown in FIG. 10, and further comprises, after reclosing 208 the flight deck door, monitoring 302 the position of the deployable attendant seat assembly in the barrier configuration, and when fully deployed, activating 304 an indicator that can be located in a flight deck, for example, to confirm that the deployable attendant seat assembly in the deployed configuration (e.g., configured to form a barrier) is in a closed position. The methods set forth herein can incorporate the use of the deployable attendant seat assembly, vehicle cabins comprising the deployable attendant seat assembly, and vehicles comprising the cabins comprising the deployable attendant seat assembly of the type described herein and shown at least in FIGS. 1, 2, 3A, 3B, 4A, 4B, 5, 6A, 6B, 6C, 7A, 7B, 8A, 8B, and 9.

According to present aspects, the barrier that is established can act as a secondary barrier to inhibit a person that is in the passenger section of aircraft 100 from moving into the vestibule 120 and into the flight deck 110. In some examples, the barrier functions to slow the movement of the person into the vestibule 120. The barrier causes a time delay for unwanted passenger entry into areas forward of the deployed and established barrier as it requires the unwanted person to break the barrier or otherwise move the barrier to the open position. This time delay provides for flight personnel to move into the flight deck 110 and secure the flight deck door 110a. The flight deck door 110a is more secure than the barrier and may prevent the person from reaching the flight deck 110.

As stated herein, the aircraft 100 can be equipped with a barrier monitoring system 500 as illustrated in FIGS. 12 and 13. The monitoring system 500 receives signals from a sensor 512 at the flight deck door 110a and a sensor 510 at the barrier. The monitoring system 500 provides flight personnel in the flight deck 110 the status of the flight deck door 110a and the barrier. This prevents the flight deck door 110a from being opened when the barrier is in the open position. The sensor 210 senses the position of the barrier and sensor 512 senses the position of the flight deck door 110a. A control unit 501 receives signals from the sensors 510, 512 and monitors the positioning. An indicator 509 such as a light or audible alarm is positioned in the flight deck 110. Prior to opening the flight deck door 110a, the flight personnel checks the status of the barrier formed deployable attendant seat assembly 126 moved into the barrier configuration. If the deployable attendant seat assembly 126 is in the barrier position (e.g., the deployed configuration with the deployed attendant seat assembly configured to be a barrier), the flight deck door 110a can be opened. This provides for the flight personnel to access the vestibule 120 of the cabin area 103, such as to use the lavatory. If the deployable attendant seat assembly 126 is not in a position fully engaged as a barrier (e.g., in an "open" or not fully engaged position as a barrier), the flight deck door 110a remains closed. This prevents a person that may be in the vestibule 120 from gaining access to the flight deck 110.

In some examples, control unit 501 controls the lock 540 on the flight deck door 110a. The control unit 501 maintains the lock 540 engaged when the deployable attendant seat assembly 126 is in the open position. The control unit 501 disengages the lock 540 and allows it to be opened when the deployable attendant seat assembly is a barrier and is a fully closed position.

The control unit 501 monitors the status and operation of the flight deck door 110a. As illustrated in FIG. 13, the control unit 501 includes processing circuitry 502 and memory circuitry 503. The processing circuitry 502 controls overall operation of the monitoring according to program instructions stored in the memory circuitry 503. The processing circuitry 502 can include one or more circuits, microcontrollers, microprocessors, hardware, or a combination thereof. Memory circuitry 503 includes a non-transitory computer readable storage medium storing program instructions, such as a computer program product, that configures the processing circuitry 502 to implement one or more of the techniques discussed herein. Memory circuitry 503 can include various memory devices such as, for example, read-only memory, and flash memory.

The control unit 501 includes communication circuitry 508 that provides for communication functionality with the sensors 512, 510. The communication circuitry 508 can provide for one-way communications from the sensors 512, 510 or two-way communications that are both to and from the sensors 512, 510. The control unit 501 can also communicate with other systems on the aircraft 100, such as a flight control system that controls the operations of the aircraft during flight.

A user interface 504 provides for flight personnel to monitor the status. The user interface 504 can include one or more input devices 506 such as but not limited to a keypad, touchpad, roller ball, and joystick. The user interface 504 can also include one or more displays 205 for displaying information. Displays 505 can be positioned in one or more of the flight deck 110 and vestibule 120.

The indicator 509 provides for a visual and/or audible indication of the status of one or both of the flight deck door 110 and the deployable attendant seat assembly 126. The indicator 509 can be a separate device, or can be incorporated within the user interface 504, such as a display icon on a display 505.

In one example, the lock 540 includes a metallic strip that extends along one of the outer sides (e.g., lateral side). The lock 540 also includes an electromagnetic locking device that engages with the metallic strip to secure the position when the deployable attendant seat assembly 126 is in the closed/barrier position. Flight personnel can unlock the lock 540 from the front side and allow for moving the deployable attendant seat assembly 126 back to a stowed (e.g., non-barrier) position. In the event of a power outage, the lock 540 is configured to disengage to provide for moving the deployable attendant seat assembly 126 from the barrier position to the "non-barrier", open position.

The term "substantially" as used herein means that a particular characteristic, parameter, or value does not need to be exactly achieved. Rather, deviations or variations, including, for example, tolerances, measurement error, measurement accuracy limitations, and other factors known to those skilled in the field, may occur in amounts that do not preclude the effect that the characteristic was intended to provide.

While a vehicle in the form of an aircraft is illustrated in the present FIGS., the present aspects can be incorporated to provide the improved barrier incorporating the deployable attendant seat assembly in a passenger vehicle including an aircraft, a rotorcraft, a marine vehicle, a terrestrial vehicle, a hovercraft, and combinations thereof.

The present aspects may, of course, be carried out in other ways than those specifically set forth herein without departing from essential characteristics of the disclosure. The present aspects are to be considered in all respects as illustrative and not restrictive, and all changes coming within the meaning and equivalency range of the appended claims are intended to be embraced therein.

What is claimed is:

1. An aircraft cabin barrier comprising:
a deployed attendant seat assembly located within a vestibule area of an aircraft cabin, said deployed attendant seat assembly comprising:
a deployed attendant seat;
a movable back panel having a movable back panel first side and a movable back panel second side, said movable back panel first side fixedly attached to the deployed attendant seat, said movable back panel configured to extend laterally from a movable back panel stowed position to a movable back panel deployed position;
an aircraft cabin first monument located within the vestibule area of the aircraft cabin, said aircraft cabin first monument comprising an aircraft cabin first monument wall positioned immediately adjacent to the movable back panel when the movable back panel is in the movable back panel stowed position;
an aircraft cabin second monument located within the vestibule area of the aircraft cabin, said aircraft cabin second monument positioned across an aircraft cabin aisle from the aircraft cabin first monument, said aircraft cabin second monument comprising a second aircraft cabin monument outer surface;
a track assembly, said track assembly comprising a track assembly first component and a track assembly second component, said track assembly first component fixedly attached to the aircraft cabin first monument wall, said track assembly second component fixedly attached to the movable back panel second side, said track assembly first component configured to movably engage with said track assembly second component;
wherein said track assembly is configured to movably attach the movable back panel to the aircraft cabin first monument wall, said track assembly further configured to control lateral movement of the movable back panel relative to the aircraft cabin first monument wall along a track path, said track path extending between the movable back panel stowed position and the movable back panel deployed position, said track path further comprising a track path initial position and a track path extended position; and wherein said movable back panel comprises a movable back panel first leading vertical edge comprising a first mating component, said first mating component configured to mate with a second mating component in the movable back panel deployed position to form the aircraft cabin barrier, said second mating component positioned at the aircraft cabin second monument outer surface of aircraft cabin second monument, said aircraft cabin second monument outer surface located at a selected distance from and across an aircraft cabin aisle from the aircraft cabin first monument wall.

2. The aircraft cabin barrier of claim 1, wherein the movable back panel in the movable back panel stowed position is substantially within a first aircraft cabin monument footprint.

3. The aircraft cabin barrier of claim 1, wherein the movable back panel is integral with the deployable attendant seat.

4. The aircraft cabin barrier of claim 1, wherein the movable back panel comprises a movable back panel height selected to leave a gap between a movable back panel top edge and an aircraft cabin ceiling when the movable back panel is in the movable back panel deployed position, said gap comprising an average gap width ranging from about 2 inches to about 8 inches.

5. The aircraft cabin barrier of claim 1, wherein the track assembly is configured to lock when the movable back panel is in the movable back panel deployed position and the track assembly is in the extended track path position.

6. The aircraft cabin barrier of claim 1, wherein the movable back panel further comprises a movable back panel leading vertical first edge and a movable back panel trailing vertical second edge, said movable back panel is configured to pivot radially at the movable back second trailing vertical second edge when the movable back panel is in the movable back panel deployed position and the track assembly is in the extended track path position.

7. The aircraft cabin barrier of claim 1, wherein the movable back panel comprises a movable back panel thickness extending from a movable back panel first side to a movable back panel second side, said movable back panel comprising a through opening extending through the movable back panel thickness.

8. The aircraft cabin barrier of claim 1, wherein the aircraft cabin second monument comprises an extendible panel, said extendible panel configured to deploy from an extendible panel stowed position adjacent the aircraft cabin second monument outer surface to an extendible panel deployed position, said extendible panel comprising the second mating component.

9. The aircraft cabin barrier of claim 1, wherein said second mating component is configured to mate with the first mating component in a locked configuration.

10. The aircraft cabin barrier of claim 8, wherein the extendible panel in the extendible panel deployed position is configured to engage with the movable back panel in the movable back deployed position at an angle of approximately 90 degrees.

11. An aircraft cabin comprising the aircraft cabin barrier of claim 1.

12. An aircraft comprising the aircraft cabin barrier of claim 1.

13. A deployable aircraft cabin attendant seat comprising:
an attendant seat located within a vestibule area of an aircraft cabin, said attendant seat located adjacent to an aircraft cabin first monument, said aircraft cabin first monument comprising an aircraft cabin first monument wall;
a movable back panel having a movable back panel first side and a movable back panel second side, said movable back panel first side fixedly attached to the attendant seat, said movable back panel configured to move from a movable back panel stowed position to a movable back panel deployed position, said movable back panel positioned adjacent to the aircraft cabin first monument wall when the movable back panel is in the movable back panel stowed position, said movable back panel configured to engage an aircraft cabin second monument in a movable back panel deployed position, said aircraft cabin second monument located within the vestibule area of the aircraft cabin, said aircraft cabin second monument positioned across an aircraft cabin aisle from the aircraft cabin first monument;
a track assembly, said track assembly comprising a first cooperating track assembly component, said first cooperating track assembly component fixedly attached to the aircraft cabin first monument wall, a second cooperating track assembly component said second cooperating track assembly component fixedly attached to the movable back panel second side, said first cooperating track assembly component configured to movably engage with said second cooperating track assembly component; and
wherein said track assembly is configured to movably attach the movable back panel to the aircraft cabin first monument wall, said track assembly further configured to control lateral movement of the movable back panel relative to the aircraft cabin first monument wall along a track path, said track path extending between the movable back panel stowed position and the movable back panel deployed position, said track path comprising a track path initial position and a track path extended position.

14. The deployable aircraft cabin attendant seat of claim 13, wherein the track assembly comprises a locking mechanism to maintain the movable back panel at a selected track path extended position.

15. The deployable aircraft cabin attendant seat of claim 13, wherein the movable back panel is configured to pivot radially when the movable back panel is in the movable back panel deployed position and the track assembly is in the track path extended position.

16. The deployable aircraft cabin attendant seat of claim 13, wherein the movable back panel is integral with the deployable attendant seat.

17. The deployable aircraft cabin attendant seat of claim 13, wherein the movable back panel further comprises a movable back panel thickness, said movable back panel comprising a through opening through the movable back panel thickness.

18. An aircraft cabin comprising the deployable aircraft cabin attendant seat of claim 13.

19. An aircraft comprising the deployable aircraft cabin attendant seat of claim 13.

20. A method of controlling movement of passengers along an aisle within a vestibule area of an aircraft cabin, the method comprising:
prior to opening a flight deck door, moving a barrier located in the vestibule area to a closed position with a flight deck being on a first side of the barrier, the barrier comprising:

a deployed attendant seat;

a movable back panel, said movable back panel fixedly attached to the deployed attendant seat, said movable back panel configured to move from a movable back panel stowed position to a movable back panel deployed position, said movable back panel positioned adjacent to an aircraft cabin first monument wall of an aircraft cabin first monument when the movable back panel is in the movable back panel stowed position, said movable back panel having a movable back panel first side and a movable back panel second side, said movable back panel first side fixedly attached to the deployed attendant seat, said movable back panel configured to extend laterally from the movable back panel stowed position to the movable back panel deployed position;

an aircraft cabin first monument located within the vestibule area of the aircraft cabin, said aircraft cabin first monument comprising an aircraft cabin first monument wall positioned immediately adjacent to the movable back panel when the movable back panel is in the movable back panel stowed position;

an aircraft cabin second monument located within the vestibule area of the aircraft cabin, said aircraft cabin second monument positioned across an aircraft cabin aisle from the aircraft cabin first monument, said aircraft cabin second monument comprising a second aircraft cabin monument outer surface;

a track assembly, said track assembly comprising a first cooperating track assembly component, said first cooperating track assembly component fixedly attached to the aircraft cabin first monument wall, a second cooperating track assembly component, said second cooperating track assembly component fixedly attached to the movable back panel second side, said first cooperating track assembly component configured to movably engage with said second cooperating track assembly component to form the track assembly, said track assembly further comprising a track path, said track path extending from an initial track path position when the movable back panel is in the movable back panel stowed position to an extended track path position when the movable back panel is in the movable back panel deployed position, said track assembly further comprising a locking mechanism to maintain the movable back panel at a selected track path position;

locking the barrier in a closed position;

after locking the barrier, opening the flight deck door and providing access to flight personnel to a front section of the cabin area, said front section of the cabin area located at the first side of the barrier; and after providing access to the front section of the cabin area to the flight personnel, reclosing the flight deck door.

21. The method of claim 20, further comprising:

monitoring a position of the barrier; and activating an indicator in the flight deck when the barrier is in the closed position.

* * * * *